(12) United States Patent
Guo et al.

(10) Patent No.: US 12,739,000 B2
(45) Date of Patent: Sep. 15, 2026

(54) BEAMFORMING WEIGHT CALCULATION METHOD AND RELATED APPARATUS

(71) Applicant: HUAWEI TECHNOLOGIES CO., LTD., Shenzhen (CN)

(72) Inventors: Senbao Guo, Xi'an (CN); Guibao Li, Xi'an (CN); Heng Qin, Xi'an (CN); Fangfang Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 18/665,925

(22) Filed: May 16, 2024

(65) Prior Publication Data

US 2024/0305342 A1 Sep. 12, 2024

Related U.S. Application Data

(63) Continuation of application No. PCT/CN2022/131645, filed on Nov. 14, 2022.

(30) Foreign Application Priority Data

Nov. 19, 2021 (CN) ......................... 202111401057.9

(51) Int. Cl.
*H04B 7/06* (2006.01)

(52) U.S. Cl.
CPC ......... *H04B 7/0617* (2013.01); *H04B 7/0632* (2013.01)

(58) Field of Classification Search
None
See application file for complete search history.

(56) References Cited

U.S. PATENT DOCUMENTS

| | | | | |
|---|---|---|---|---|
| 12,126,414 | B2 * | 10/2024 | Berg | H04B 7/0617 |
| 2015/0043474 | A1 * | 2/2015 | Takeda | H04L 5/0037 370/329 |
| 2016/0323026 | A1 | 11/2016 | Zhu et al. | |

FOREIGN PATENT DOCUMENTS

| | | | |
|---|---|---|---|
| CN | 112152681 | A | 12/2020 |

OTHER PUBLICATIONS

3GPP TS 38.214 V16.2.0 (Jun. 2020), 3rd Generation Partnership Project; Technical Specification Group Radio Access 1 Network; NR; Physical layer procedures for data(Release 16), total 163 pages.

* cited by examiner

*Primary Examiner* — Hong S Cho
(74) *Attorney, Agent, or Firm* — Rimon PC

(57) ABSTRACT

Embodiments of this application disclose a beamforming weight calculation method. X sub resource block groups are determined, where one of the X sub resource block groups includes a part of a resource block group and based on the X sub resource block groups, a beamforming weight calculation method used for a plurality of sub resource block groups in the X sub resource block groups is determined. The beamforming weight calculation method includes normalized-eigen beamforming or power limited-eigen beamforming. Based on the beamforming weight calculation method corresponding to each sub resource block group in the plurality of sub resource block groups, a beamforming weight corresponding to the each sub resource block group is obtained. Data is then weighted based on the beamforming weight and sent. This way for each sub resource block group, a corresponding beamforming weight calculation method is adaptively determined, and a corresponding beamforming weight is obtained.

20 Claims, 6 Drawing Sheets

| | Antenna 1 | Antenna 2 | Antenna 3 | Antenna 4 | Antenna 5 | Antenna 6 |
|---|---|---|---|---|---|---|
| Power of a first sub resource block group | 1 | 1 | 1 | $\alpha_0$ | $\alpha_1$ | $\alpha_2$ |
| Power of a second sub resource block group | 1 | 1 | 1 | $2-\alpha_0$ | $2-\alpha_1$ | $2-\alpha_2$ |

FIG. 5

| | Layer 1 | Layer 2 | Layer 3 | Layer 4 | Layer 5 | Layer 6 |
|---|---|---|---|---|---|---|
| Power of a first user | 1 | 1 | 1 | $\alpha_0$ | $\alpha_1$ | $\alpha_2$ |
| Power of a second user | 1 | 1 | 1 | $2-\alpha_0$ | $2-\alpha_1$ | $2-\alpha_2$ |

FIG. 6

| | Layer 1 | Layer 2 | Layer 3 | Layer 4 | Layer 5 | Layer 6 |
|---|---|---|---|---|---|---|
| Power of a first user group (first user) | 1 | 1 | 1 | $\alpha_0$ | $\alpha_1$ | $\alpha_2$ |
| Power of a second user group (first user and second user) | 1 | 1 | 1 | $2-\alpha_0$ | $2-\alpha_1$ | $2-\alpha_2$ |

FIG. 7

BEAMFORMING WEIGHT CALCULATION METHOD AND RELATED APPARATUS

CROSS-REFERENCE TO RELATED APPLICATIONS

This application is a continuation of International Application No. PCT/CN2022/131645, filed on Nov. 14, 2022, which claims priority to Chinese Patent Application No. 202111401057.9, filed on Nov. 19, 2021. The disclosures of the aforementioned applications are herein incorporated by reference in their entireties.

TECHNICAL FIELD

This application relates to the field of communications technologies, and in particular, to a beamforming weight calculation method and a related apparatus.

BACKGROUND

In a multiple-input multiple-output (MIMO) system, because the power of each antenna element is limited, a conventional unit resource element power normalization algorithm is limited in application in an actual system, and all antennas need to be normalized to the power of a maximum-power antenna. As a result, there is a waste of power in an antenna other than the maximum-power antenna which is not used for full-power transmission. For example, a power limited-eigen beamforming (PEBF) weight calculation method is used, and an average power utilization ratio is low.

To resolve the foregoing problem, a current algorithm idea mainly includes an interior point iteration method and a subgradient optimal gradient descent method, both of which have a risk of slow convergence or non-convergence, and are complex to implement. Some algorithms even aim to maximize a minimum user throughput, which may not necessarily maximize a throughput of a user.

Therefore, a new beamforming weight calculation method is urgently needed to minimize interference between users and maximize a power utilization ratio.

SUMMARY

According to a first aspect, an embodiment of this application provides a beamforming weight calculation method, including:

- determining X sub resource block groups based on a scheduled resource block group, where one of the X sub resource block groups includes a part of the resource block group, all resource block groups in each sub resource block group are occupied by a user, and X is a positive integer greater than 1;
- determining, based on the X sub resource block groups, a beamforming weight calculation method used for each sub resource block group, where the beamforming weight calculation method includes normalized-eigen beamforming (NEBF) or power limited-eigen beamforming (PEBF);
- obtaining, based on the beamforming weight calculation method corresponding to each sub resource block group, a beamforming weight corresponding to the sub resource block group;

weighting data based on the beamforming weight; and sending weighted data.

Currently, commonly used beamforming calculation methods include: PEBF and NEBF. PEBF can ensure that power of a maximum-power antenna port does not overrun. NEBF can achieve that power of each antenna reaches a maximum power value of the antenna.

A multi-user weight (MU weight, referred to as a weight for short below) corresponding to a $j^{th}$ resource block group (RBG) is used as an example for description. The weight is used to perform weighting processing on to-be-sent data, and j is a positive integer.

Multi-user weight: Because a plurality of users send data in a same resource block group, different weights need to be used when weighting operations need to be performed on different user data. In addition, weights of different users need to ensure that data interference between the users is minimized, or a data throughput is maximized. Therefore, the weight is also referred to as a multi-user weight.

In some embodiments network device may first determine a resource block group scheduled by each of one or more users managed by the network device. The scheduled resource block group may also be understood as a resource block group allocated by the network device to the user. Then, the network device determines X sub resource block groups based on the scheduled resource block group. One of the X sub resource block groups includes a part of the resource block group, all resource block groups in each sub resource block group are occupied by a user, and X is a positive integer greater than 1. For example, X=2. In this case, two sub resource block groups determined based on the scheduled resource block group include a first sub resource block group and a second sub resource block group. A user in the first sub resource block group schedules an RBG 1, an RBG 2, and an RBG 3. A user in the second sub resource block group schedules an RBG 4, an RBG 5, and an RBG 6.

Then, a beamforming weight calculation method used for each sub resource block group is determined based on the X sub resource block groups. The beamforming weight calculation method includes NEBF or PEBF. A beamforming weight corresponding to each sub resource block group is obtained based on the beamforming weight calculation method corresponding to the sub resource block group. Data is weighted based on the beamforming weight. Weighted data is sent.

1. Beamforming Weight Calculation Method.

In a multi-user multiple-input multiple-output (MU-MIMO) system, to avoid impact on orthogonality between multiple users caused when transmit power of an antenna exceeds a maximum value, the network device generally performs maximum transmit power normalization processing on transmit power of a plurality of antennas by using a beamforming weight calculation method, to obtain a beamforming weight. The network device weights data based on the beamforming weight, and then sends weighted data.

Currently, commonly used beamforming calculation methods include: PEBF and NEBF.

2. PEBF.

PEBF can ensure that power of a maximum-power antenna port does not overrun. The following describes an example calculation procedure of PEBF:

The multi-user weight (MU weight, referred to as a weight for short below) corresponding to the $j^{th}$ RBG is used as an example for description. The weight is used to perform weighting processing on to-be-sent data, and j is a positive integer.

Multi-user weight: Because a plurality of users send data in a same resource block group, different weights need to be used when weighting operations need to be performed on different user data. In addition, weights of different users need to ensure that data interference between the users is minimized, or a data throughput is maximized. Therefore, the weight is also referred to as a multi-user weight. The weight is as follows:

$$W_{j,l}^{MU} = \left[W_{j,l}^{MU}(0), W_{j,l}^{MU}(1), \dots , W_{j,l}^{MU}(M-1)\right]^T.$$

$$W_{j,l}^{MU}$$

is a weight of an $l^{th}$ layer in the $j^{th}$ RBG, the weight of the $l^{th}$ layer in the $j^{th}$RBG is $$W_{j,l}^{MU} \in C^{M\times 1},$$

M is a positive integer, $$W_{j,l}^{MU}$$

(n) represents an $n^{th}$ element of the vector $$W_{j,l}^{MU},$$

the $n^{th}$ element corresponds to a weight of an $n^{th}$ antenna, n is an integer greater than or equal to 0, n=0,1, . . . , M−1, and M is a number of antenna ports of the network device.

It is assumed that an intermediate variable is as follows:

$$E_n = \sqrt{\frac{M}{\frac{\sum_{j=1}^{N_{BfRbgNum}} \sum_{l=1}^{L_{layer,j}} (p_{j,l} * PA_{j,l})}{\sum_{j=1}^{N_{BfRbgNum}} \sum_{l=1}^{L_{layer,j}} \left(\left\|W_{j,l}^{MU}(n)\right\|^2 * PA_{j,l}\right)}}}.$$

$N_{BfRbgNum}$ is a number of RBGs that are in the network device and for which a weight is calculated by using PEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a time division duplex (TDD) interface and index table based on an index value of a power allocation (PA) interface, $p_{j,l}$ is a power proportionality coefficient of an $l^{th}$ stream weight in the $j^{th}$ RBG in a current transmission time interval (TTI), the power proportionality coefficient is a percentage of power of the $l^{th}$ layer in total power of all layers, and $$\left\|W_{j,l}^{MU}(n)\right\|^2$$

is a power value of an $n^{th}$ element at the $l^{th}$ layer in the $j^{th}$ RBG.

Based on the intermediate variable $E_n$, a PEBF weight power adjustment factor $\tau_{PEBF}$ is calculated as follows:

$$\tau_{PEBF} = \frac{1}{\max(E_0, E_1, \dots , E_{M-1})}.$$

Based on the PEBF weight power adjustment factor $\tau_{PEBF}$, a beamforming weight $$W_j^{MU,PEBF}$$

of the $j^{th}$ RBG is obtained as follows:

$$W_j^{MU,PEBF} = \tau_{PEBF} \cdot W_j^{MU},\ j = 0, 1, \dots , N_{BfRbgNum} - 1.$$

3. NEBF.

NEBF can achieve that power of each antenna reaches a maximum power value of the antenna. The following describes an example calculation procedure of NEBF:

The weight corresponding to the $j^{th}$ RBG is used as an example for description. The weight is used to perform weighting processing on to-be-sent data, and j is a positive integer. The weight is as follows:

$$W_{j,l}^{MU} = \left[W_{j,l}^{MU}(0), W_{j,l}^{MU}(1), \dots , W_{j,l}^{MU}(M-1)\right]^T.$$

$$W_{j,l}^{MU}$$

is a weight of an $l^{th}$ layer in the $j^{th}$ RBG, the weight of the $l^{th}$ layer in the $j^{th}$RBG is $$W_{j,l}^{MU} \in C^{M\times 1},$$

M is a positive integer $$W_{j,l}^{MU}$$

(n) represents an $n^{th}$ element of the vector $$W_{j,l}^{MU},$$

the $n^{th}$ element corresponds to a weight of an $n^{th}$ antenna, n is an integer greater than or equal to 0, and n=0,1, . . . , M−1.

It is assumed that an intermediate variable is as follows:

$$E_n = \sqrt{\frac{M}{\frac{\sum_{j=1}^{N_{BfRbgNum}} \sum_{l=1}^{L_{layer,j}} (p_{j,l} * PA_{j,l})}{\sum_{j=1}^{N_{BfRbgNum}} \sum_{l=1}^{L_{layer,j}} \left(\left\|W_{j,l}^{MU}(n)\right\|^2 * PA_{j,l}\right)}}}.$$

$N_{BfRbgNum}$ is a number of RBGs that are in the network device and for which a weight is calculated by using NEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, $p_{j,l}$ is a power proportionality coefficient of an $l^{th}$ stream weight in the $j^{th}$ RBG in a current TTI, the power proportionality coefficient is a percentage of power of the $l^{th}$ layer in total power of all layers, and $$\|W_{j,l}^{MU}(n)\|^2$$

is a power value of an $n^{th}$ element at the $l^{th}$ layer in the $j^{th}$ RBG.

A beamforming weight $$W_j^{MU,PEBF}$$

of the $j^{th}$ RBG is obtained based on the intermediate variable, and an $n^{th}$ row of elements in the beamforming weight $$W_j^{MU,PEBF} \text{ is } W_j^{MU,NEBF}(n):$$

$$W_j^{MU,NEBF}(n) = \frac{1}{E_n} \cdot W_j^{MU}(n),\ j = 0, 1, \ldots, N_{BfRbgNum} - 1.$$

Embodiments of this application provide a beamforming weight calculation method, to minimize interference between users and maximize a power utilization ratio. A plurality of sub resource block groups are determined based on a scheduled resource block group. Users in each sub resource block group schedule a same resource block group. A beamforming weight calculation method used for each sub resource block group is determined based on the plurality of sub resource block groups. The beamforming weight calculation method includes NEBF or PEBF. Then, a beamforming weight corresponding to each sub resource block group is obtained based on the beamforming weight calculation method corresponding to the sub resource block group. Finally, data is weighted based on the beamforming weight, and weighted data is sent. According to the foregoing method, for each sub resource block group, a corresponding beamforming weight calculation method is adaptively determined, and a corresponding beamforming weight is obtained based on the determined beamforming calculation method, to implement optimal performance. This effectively improves a power utilization ratio of downlink data sending in the network device, effectively improves spectral efficiency of a cell, and improves an average throughput of the cell.

With reference to the first aspect, in a possible implementation of the first aspect, the determining, based on the X sub resource block groups, a beamforming weight calculation method used for each sub resource block group includes:

detecting a number of users scheduled in the sub resource block group;

when a single user (SU) is scheduled in the sub resource block group, determining that NEBF is used for the sub resource block group; and when multiple users (MU) are scheduled in the sub resource block group, detecting whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

When detecting that a single user is scheduled in the sub resource block group, the network device may determine that a beamforming weight corresponding to the sub resource block group is obtained for the sub resource block group by using NEBF. In some embodiment of this application, that a beamforming weight corresponding to the sub resource block group is obtained by using NEBF is also referred to as that a beamforming weight corresponding to the sub resource block group is calculated by using NEBF.

In embodiments of this application, an RBG for which a beamforming weight is calculated by using NEBF is referred to as an NEBF set. The NEBF set is also referred to as an NEBF RBG. The NEBF RBG includes one or more sub resource block groups, and for each sub resource block group in the NEBF RBG, the beamforming weight is calculated by using NEBF.

The network device groups sub resource block groups in which a single user is scheduled into an NEBF set (NEBF RBG). After determining that NEBF is used for the sub resource block group, the network device delivers the processing manner (of calculating the beamforming weight of the sub resource block by using NEBF) to a physical layer (the physical layer is also referred to as an L1 layer) through a media access control (MAC) layer (the MAC layer is also referred to as an L2 layer).

When the network device detects that multiple users are scheduled in the sub resource block group, the network device further detects whether the sub resource block group meets a first preset condition. The first preset condition includes one or more of the following:

(A). An average modulation and coding scheme (MCS) of the multiple users in the sub resource block group is less than a first threshold.

(B). A difference between a first signal to interference plus noise ratio and a second signal to interference plus noise ratio is less than a second threshold. The first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF.

First, the network device calculates weight power of the sub resource block group by using NEBF. The obtained weight power is referred to as first weight power. The network device calculates weight power of the sub resource block group by using PEBF. The obtained weight power is referred to as second weight power. Then, the network device calculates a signal to interference plus noise ratio (SINR) based on the first weight power. The obtained signal to interference plus noise ratio is referred to as a first signal to interference plus noise ratio. The network device calculates a signal to interference plus noise ratio based on the second weight power. The obtained signal to interference plus noise ratio is referred to as a second signal to interference plus noise ratio. Next, the network device detects whether a difference (the difference is referred to as $\Delta SINR_{average}$ in embodiments of this application) between the first signal to interference plus noise ratio and the second signal to interference plus noise ratio is less than a second threshold (the second threshold is referred to as Thr2 in embodiments of this application). If the difference is less than the second threshold, the first preset condition is met, and it is determined that the beamforming weight of the sub resource block group is calculated for the sub resource block group by using NEBF. If the difference is greater than or equal to the second threshold, the first preset condition is not met, and it is determined that the beamforming weight of the sub resource block group is calculated for the sub resource block group by using PEBF. That is, when $\Delta SINR_{average}<Thr2$, the beamforming weight is calculated for the RBG by using NEBF; when $\Delta SINR_{average}\geq Thr2$, the beamforming weight is calculated for the RBG by using PEBF.

(C). Channel correlation or weight correlation between the users in the sub resource block groups is less than a third threshold. The channel correlation and the weight correlation may be represented by using a correlation metric, or may be represented by using a normalized mean square error (NMSE). This is not limited herein. In embodiments of this application, the channel correlation or the weight correlation between the users in the sub resource block group is referred to as $\Delta Corr_{average}$, and the third threshold is referred to as Thr3. When $\Delta Corr_{average}<Thr3$, the beamforming weight is calculated for the RBG by using NEBF; when $\Delta Corr_{average}\geq Thr3$, the beamforming weight is calculated for the RBG by using PEBF.

In embodiments of this application, for each sub resource block group, a corresponding beamforming weight calculation method is adaptively determined, and a corresponding beamforming weight is obtained based on the determined beamforming calculation method, to implement optimal performance. This effectively improves a power utilization ratio of downlink data sending in the network device, effectively improves spectral efficiency of a cell, and improves an average throughput of the cell.

With reference to the first aspect, in a possible implementation of the first aspect, when the users scheduled in the sub resource block group include a user sensitive to a weight direction change, skipping calculating the beamforming weight of the user sensitive to the weight direction change in the sub resource block group.

It should be noted that, when the users scheduled in the sub resource group include a user sensitive to a weight direction change, a beamforming weight of the user sensitive to the weight direction change in the sub resource block group is not calculated. The user sensitive to the weight direction change still uses an original weight to weight data. The user sensitive to the weight direction change may be understood as a user whose user performance is significantly degraded when a weight direction changes. For example, when the users scheduled in the sub resource group include a transmission mode 4 (TM4) user, a beamforming weight of the TM4 user in the sub resource block group is not calculated. The TM4 user still uses an original weight to weight data.

With reference to the first aspect, in a possible implementation of the first aspect, the calculating the beamforming weight based on the beamforming weight calculation method corresponding to the sub resource block group includes:

- calculating average transmit power of an NEBF set by using NEBF, where the NEBF set includes one or more sub resource block groups, and the beamforming weight is calculated for the sub resource block group in the NEBF set by using NEBF;
- calculating weight power of the NEBF set on an $n^{th}$ antenna by using NEBF, where n is an integer greater than or equal to 0;
- determining average transmit power of the NEBF set on the $n^{th}$ antenna based on the average transmit power of the NEBF set and the weight power of the NEBF set on the $n^{th}$ antenna; and
- performing, based on the average transmit power of the NEBF set on the $n^{th}$ antenna, normalization processing on a weight corresponding to the sub resource block group in the NEBF set, to obtain the beamforming weight corresponding to the sub resource block group.

First, the network device determines an NEBF set. The NEBF set includes one or more sub resource block groups, and a beamforming weight is calculated for the sub resource block group in the NEBF set by using NEBF. In other words, all sub resource block groups that are in the network device and for which a beamforming weight is calculated by using NEBF are referred to as an NEBF set. In embodiments of this application, the NEBF set is also referred to as an NEBF RBG.

For example, the sub resource block groups determined by the network device include a first sub resource block group, a second sub resource block group, a third sub resource block group, and a fourth sub resource block group. According to the foregoing method, sub resource block groups (that is, the NEBF set) for which the network device determines that a beamforming weight is calculated by using NEBF include the first sub resource block group and the second sub resource block group.

Then, the network device calculates average transmit power of the NEBF set by using NEBF, that is, calculates average transmit power of RBGs in the NEBF RBG by using NEBF. For example, average transmit power of the first sub resource block group and the second sub resource block group is calculated by using NEBF. The following method may be used for calculation:

$$E_{NEBF,aver}=\sum_{j=1}^{N_{NEBF}}\sum_{l=1}^{L_{layer,j}}(p_{j,l}*PA_{j,l}).$$

$E_{NEBF,aver}$ is the average transmit power of the NEBF set, $N_{NEBF}$ is a number of RBGs included in the NEBF RBG, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of PA is a linear value found in a TDD interface and index table based on an index value of a PA interface, $p_{j,l}$ is a power proportionality coefficient of an $l^{th}$ stream weight in the $j^{th}$ RBG in a current TTI, and the power proportionality coefficient is a percentage of power of the $l^{th}$ layer in total power of all layers.

Next, weight power of the NEBF set on an $n^{th}$ antenna is calculated by using NEBF, where n is an integer greater than or equal to 0. The following method may be used for calculation:

$$E_{NEBF}^{n}=M*\sum_{j=1}^{N_{NEBF}}\sum_{l=1}^{L_{layer,j}}(\|W_{j,l}^{MU}(n)\|^2*PA_{j,l}).$$

$$E_{NEBF}^{n}$$

is the weight power of the NEBF set on the $n^{th}$ antenna, M is a number of physical antennas in the network device, n=0 to M−1, $N_{NEBF}$ is the number of RBGs included in the NEBF RBG, $L_{layer,j}$ is the number of paired layers in the $j^{th}$ RBG, the number of paired layers is a total number of data streams sent by a plurality of users in one RBG, $PA_{j,l}$ is a power factor configured for a user in the $j^{th}$ RBG, a value of PA is a linear value found in a TDD interface and index table based on an index value of a PA interface, and $$\|W_{j,l}^{MU}(n)\|^2$$

is a power value of an $n^{th}$ antenna at the $l^{th}$ layer in the $j^{th}$ RBG.

Next, the network device determines average transmit power of the NEBF set on the $n^{th}$ antenna based on the average transmit power $E_{NEBF,aver}$ of the NEBF set and the weight power $$E_{NEBF}^{n}$$

of the NEBF set on the $n^{th}$ antenna. The following method may be used for calculation:

$$P_{NEBF}^{n}=\frac{E_{NEBF}^{n}}{E_{NEBF,aver}}.$$

$$P_{NEBF}^{n}$$

is the average transmit power of the NEBF set on the $n^{th}$ antenna, $E_{NEBF,aver}$ is the average transmit power of the NEBF set, and $$E_{NEBF}^{n}$$

is the weight power of the NEBF set on the $n^{th}$ antenna.

Finally, normalization processing is performed on a weight on the $n^{th}$ antenna based on the average transmit power $$P_{NEBF}^{n}$$

of the NEBF set on the $n^{th}$ antenna, to obtain a beamforming weight. The following method may be used for calculation:

$$W_{j,l}^{MU}(n)=\frac{W_{j,l}^{MU}}{\sqrt{P_{NEBF}^{n}}}\tau_{NEBF}.$$

$$W_{j,l}^{MU}(n)$$

is the beamforming weight of the $n^{th}$ antenna at the $l^{th}$ layer in the $j^{th}$ RBG, $$W_{j,l}^{MU}$$

is the weight of the $l^{th}$ layer in the $j^{th}$ RBG, $$P_{NEBF}^{n}$$

is the average transmit power of the NEBF set on the $n^{th}$ antenna, and $\tau_{NEBF}$ is the NEBF-base weight power adjustment factor. $\tau_{NEBF}$ may be calculated based on full-power bandwidth (FPBW) power, or $\tau_{NEBF}$ may be calculated based on $\tau_{PEBF}$, for example, $$\tau_{NEBF}=\frac{1}{\tau_{PEBF}},$$

that is, $\tau_{NEBF}$ may be greater than 1.

With reference to the first aspect, in a possible implementation of the first aspect, the calculating the beamforming weight based on the beamforming weight calculation method corresponding to the sub resource block group includes:

- calculating average transmit power of a PEBF set by using PEBF, where the PEBF set includes one or more sub resource block groups, and the beamforming weight is calculated for the sub resource block group in the PEBF set by using PEBF;
- calculating weight power of the PEBF set on an $n^{th}$ antenna by using PEBF, where n is an integer greater than or equal to 0;

determining average transmit power of the PEBF set on the $n^{th}$ antenna based on the average transmit power of the PEBF set and the weight power of the PEBF set on the $n^{th}$ antenna; and performing, based on the average transmit power of the PEBF set on the $n^{th}$ antenna, normalization processing on a weight corresponding to the sub resource block group in the PEBF set, to obtain the beamforming weight corresponding to the sub resource block group.

First, the network device determines a PEBF set. The PEBF set includes one or more sub resource block groups, and a beamforming weight is calculated for the sub resource block group in the PEBF set by using PEBF. In other words, all sub resource block groups that are in the network device and for which a beamforming weight is calculated by using PEBF are referred to as a PEBF set. In embodiments of this application, the PEBF set is also referred to as a PEBF RBG.

For example, the sub resource block groups determined by the network device include a first sub resource block group, a second sub resource block group, a third sub resource block group, and a fourth sub resource block group. According to the foregoing method, sub resource block groups (that is, the PEBF set) for which the network device determines that a beamforming weight is calculated by using PEBF include the first sub resource block group and the second sub resource block group.

Then, the network device calculates average transmit power of the PEBF set by using PEBF, that is, calculates average transmit power of RBGs in the PEBF RBG by using PEBF. For example, average transmit power of the first sub resource block group and the second sub resource block group is calculated by using PEBF. The following method may be used for calculation:

$$E_{PEBF,aver} = \sum_{j=1}^{N_{PEBF}} \sum_{l=1}^{L_{layer,j}} (p_{j,l} * PA_{j,l}).$$

$E_{PEBF,aver}$ is the average transmit power of the PEBF set, $N_{PEBF}$ is a number of RBGs included in the PEBF RBG, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, $p_{j,l}$ is a power proportionality coefficient of an $l^{th}$ stream weight in the $j^{th}$ RBG in a current TTI, and the power proportionality coefficient is a percentage of power of the $l^{th}$ layer in total power of all layers.

Next, weight power of the PEBF set on an $n^{th}$ antenna is calculated by using PEBF, where n is an integer greater than or equal to 0. The following method may be used for calculation:

$$E_{PEBF}^{n} = M * \sum_{j=1}^{N_{PEBF}} \sum_{l=1}^{L_{layer,j}} \left( \left\| W_{j,l}^{MU}(n) \right\|^2 * PA_{j,l} \right).$$

$$E_{NEBF}^{n}$$

is the weight power of the PEBF set on the $n^{th}$ antenna, M is a number of physical antennas in the network device, $N_{NEBF}$ is the number of RBGs included in the PEBF RBG, $L_{layer,j}$ is the number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, and $$\left\| W_{j,l}^{MU}(n) \right\|^2$$

is a power value of an $n^{th}$ antenna at the $l^{th}$ layer in the $j^{th}$ RBG.

Next, the network device determines average transmit power of the PEBF set on the $n^{th}$ antenna based on the average transmit power $E_{PEBF,aver}$ of the PEBF set and the weight power $$E_{PEBF}^{n}$$

of the PEBF set on the $n^{th}$ antenna. The following method may be used for calculation:

$$P_{PEBF}^{n} = \frac{E_{PEBF}^{n}}{E_{PEBF,aver}}.$$

$$P_{PEBF}^{n}$$

is the average transmit power of the PEBF set on the $n^{th}$ antenna, $E_{PEBF,aver}$ is the average transmit power of the PEBF set, and $$E_{PEBF}^{n}$$

is the weight power of the PEBF set on the $n^{th}$ antenna.

Finally, normalization processing is performed on a weight on the $n^{th}$ antenna based on the average transmit power $$P_{PEBF}^{n}$$

of the PEBF set on the $n^{th}$ antenna, to obtain a beamforming weight. The following method may be used for calculation:

$$W_{j,l}^{MU}(n) = \frac{W_{j,l}^{MU}}{\sqrt{\max(P_{PEBF}^{n})}} \tau_{PEBF}.$$

$$W_{j,l}^{MU}(n)$$

is the beamforming weight of the $n^{th}$ antenna at the $l^{th}$ layer in the $j^{th}$ RBG, $$W_{j,l}^{MU}$$

is the weight of the $l^{th}$ layer in the $j^{th}$ RBG, $$\max(P_{PEBF}^{n})$$

is a maximum value of the average transmit power of the PEBF set on the $n^{th}$ antenna, and $\tau_{PEBF}$ is the PEBF-based weight power adjustment factor;

$$\tau_{PEBF} = \frac{1}{\max(E_0, E_1, \ldots, E_{M-1})}; \text{ and}$$

$$E_n = \sqrt{\frac{M}{\frac{\sum_{j=1}^{N_{BfRbgNum}} \sum_{l=1}^{L_{layer,j}} (p_{j,l} * PA_{j,l})}{\sum_{j=1}^{N_{BfRbgNum}} \sum_{l=1}^{L_{layer,j}} (\|W_{j,l}^{MU}(n)\|^2 * PA_{j,l})}}}.$$

n is an integer greater than or equal to 0, n=0,1, . . . , M−1, $N_{BfRbgNum}$ is a number of RBGs that are in the network device and for which a weight is calculated by using PEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a power allocation interface, $p_{j,l}$ is a power proportionality coefficient of an $l^{th}$ stream weight in the $j^{th}$ RBG in a current TTI, the power proportionality coefficient is a percentage of power of the $l^{th}$ layer in total power of all layers, and $$\|W_{j,l}^{MU}(n)\|^2$$

is the power value of the $n^{th}$ antenna at the $l^{th}$ layer in the $j^{th}$ RBG.

With reference to the first aspect, in a possible implementation of the first aspect, the determining, based on the X sub resource block groups, a beamforming weight calculation method used for each sub resource block group includes:

determining first weight power of the sub resource block group, where the first weight power is weight power calculated for the sub resource block group by using PEBF;

determining second weight power of the sub resource block group, where the second weight power is weight power calculated for the sub resource block group by using NEBF;

calculating a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

determining, based on the sum of the signal to interference plus noise ratio differences of the users in the sub resource block group, a sum of signal to interference plus noise ratio differences of the X sub resource block groups;

when the sum of the signal to interference plus noise ratio differences of the X sub resource block groups is greater than 0, determining that a beamforming weight calculation method used for the X sub resource block groups is PEBF; and when the sum of the signal to interference plus noise ratio differences of the X sub resource block groups is less than or equal to 0, determining that the beamforming weight calculation method used for the X sub resource block groups is NEBF.

Optionally, the calculating a sum of signal to interference plus noise ratio differences of users in the sub resource block group based on the first weight power and the second weight power includes: performing enhanced zero-forcing processing on the first weight power and the second weight power of the sub resource block group, and calculating power of each row of antennas based on the first weight power on which the enhanced zero-forcing processing is performed and the second weight power on which the enhanced zero-forcing processing is performed; calculating a power utilization ratio based on a sum of power of all antennas in the power of each row of antennas and maximum power in the power of each row of antennas; calculating power correlation of the power of each row of antennas based on the power of each row of antennas and a full-power multi-user weight vector; calculating a signal to interference plus noise ratio difference of an $l^{th}$ user in the sub resource block group based on the power correlation and the power utilization ratio, where l is a positive integer; and calculating the sum of the signal to interference plus noise ratio differences of the users in the sub resource block group.

The network device may determine first weight power and second weight power of the sub resource block group. The first weight power is weight power calculated by the network device for the sub resource block group by using PEBF, and the second weight power is weight power calculated by the network device for the sub resource block group by using NEBF.

After the first weight power and the second weight power of the sub resource block group are determined, power of each row of antennas is calculated based on the first weight power and the second weight power. The following method may be used to calculate the power of each row of antennas: $P=P_n=[P_0\ P_1\ .\ .\ .\ P_{M-1}]$, where $P_n$ is power of an $n^{th}$ antenna, n=0,1, . . . , M−1, M is an integer greater than 1, and M is a number of antenna ports of the network device.

Then, a power utilization ratio is calculated based on a sum of power of all antennas in the power of each row of antennas and maximum power in the power of each row of antennas. The following method may be used to calculate the power utilization ratio:

$$\gamma_{PEBF} = \frac{\sum_{n=0}^{M-1} P_n}{M * \max(P_n)}.$$

$\gamma_{PEBF}$ is the power utilization ratio, $\max(P_n)$ is the maximum power of the antennas in each row of antennas, and $$\sum_{n=0}^{M-1} P_n$$

is the sum of the power of all the antennas in the power of each row of antennas.

Next, power correlation of the power of each row of antennas is calculated based on the power of each row of antennas and a full-power multi-user weight vector. The following method may be used to calculate the power correlation of the power of each row of antennas:

$$\rho_{P,NEBF} = \frac{\|P \cdot P_{REF}\|}{\sqrt{\|P \cdot P\|^2 \cdot \|P_{REF} \cdot P_{REF}\|^2}}$$

$$P_{REF} = [1, 1, \ldots 1]_{M \times 1},$$

$P_{REF}$ is the full-power multi-user weight vector, and $\rho_{P,NEBF}$ is the power correlation.

Next, a signal to interference plus noise ratio difference of an $1^{th}$ user in the sub resource block group is calculated based on the power utilization ratio and the power correlation, where 1 is a positive integer. The following method may be used to calculate the signal to interference plus noise ratio difference of the $1^{th}$ user in the sub resource block group:

$$SINR_{l,Delta} = 10 \cdot \log_{10}\gamma_{PEBF} \frac{\beta_{interf,nebf} \cdot \sum_{k=0,k\neq l}^{L-1} (1 - \rho_{P,NEBF}) \cdot 10^{CQI_k/10} \cdot p_k + 1}{\rho_{P,NEBF}}$$

$\beta_{interf,nebf}$ is an interference adjustment parameter, $$\beta_{interf,nebf} = \frac{0.2}{M} \cdot e^{4 \cdot \gamma_{PEBF}} \cdot \left(1 + \frac{\gamma_{PEBF}}{0.4}\right), \rho_{P,NEBF}$$

is weight correlation between the first weight power and the second weight power, $P_k$ represents power allocated to a $k^{th}$ stream, $RB_{Num}$ is a number of sub resource block groups, $RB_{Num}$=X, $CQI_k$ is channel quality indicator (CQI) information of the $k^{th}$ stream, $SINR_{l,Delta}$ is the signal to interference plus noise ratio difference of the $1^{th}$ user in the sub resource block group, and the signal to interference plus noise ratio difference is a difference between a signal to interference plus noise ratio calculated based on first weight power of the user and a signal to interference plus noise ratio calculated based on second weight power of the user.

Finally, a sum of signal to interference plus noise ratio differences of the X sub resource block groups is determined based on a sum of signal to interference plus noise ratio differences of users in the sub resource block group. The following method may be used to calculate the sum of the signal to interference plus noise ratio differences of the X sub resource block groups:

$$SINR_{Delta} = \sum_{n=0}^{RB_{Num}} \sum_{l=0}^{L-1} SINR_{l,Delta}.$$

$$\sum_{l=0}^{L-1} SINR_{l,Delta}$$

is the sum of the signal to interference plus noise ratio differences of the users in the sub resource block group, and $SINR_{Delta}$ is the sum of the signal to interference plus noise ratio differences of the X sub resource block groups.

After calculating the sum of the signal to interference plus noise ratio differences of the X sub resource block groups, the network device determines, based on the sum of the signal to interference plus noise ratio differences of the X sub resource block groups, a beamforming calculation method used for the X sub resource block groups. When the sum of the signal to interference plus noise ratio differences of the X sub resource block groups is greater than 0, it is determined that PEBF is used for the X sub resource block groups. When the sum of the signal to interference plus noise ratio differences of the X sub resource block groups is less than or equal to 0, it is determined that NEBF is used for the X sub resource block groups.

In some embodiments of this application, for a plurality of sub resource block groups, a corresponding beamforming weight calculation method is adaptively determined by calculating channel capacities of PEBF and NEBF, and a corresponding beamforming weight is obtained based on the determined beamforming calculation method, to implement optimal performance. This effectively improves a power utilization ratio of downlink data sending in the network device, effectively improves spectral efficiency of a cell, and improves an average throughput of the cell.

With reference to the first aspect, in a possible implementation of the first aspect, initial power of a first sub resource block group is calculated by using PEBF;

initial power of a second sub resource block group is calculated by using NEBF; and power of the first sub resource block group and power of the second sub resource block group are determined based on the initial power of the first sub resource block group and the initial power of the second sub resource block group, where a sum of power of the first sub resource block group and power of the second sub resource block group in a same antenna is equal to maximum power of the same antenna.

First, the network device calculates normalized power of a first sub resource block group by using PEBF. The power is referred to as initial power of the first sub resource block group. The network device calculates normalized power of a second sub resource block group by using NEBF. The power is referred to as initial power of the second sub resource block group.

Then, the network device determines maximum power of each antenna. For example, the maximum power of the same antenna is 2.

Next, to improve a power utilization ratio of the network device, using an example in which the same antenna is used to receive and transmit only data of the first sub resource block group and data of the second sub resource block group, a sum of power of the first sub resource block group and power of the second sub resource block group needs to be equal to the maximum power of the same antenna.

For example, the network device includes an antenna 1 to an antenna 6. Maximum power of each antenna is 2, and the maximum power corresponding to each sub resource block group in each antenna is equal (maximum power of each sub resource block group in each antenna is 1). Power utilization ratios of the first sub resource block group in the antenna 1 to the antenna 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1.

In this case, initial power, calculated by using PEBF, of the first sub resource block group in the antenna 1 to the antenna 6 is 1, 1, 1, $\alpha_0$, $\alpha_1$, and $\alpha_2$, respectively. Remaining power of the first sub resource block group in the antenna 1 to the antenna 6 is 0, 0, 0, $1-\alpha_0$, $1-\alpha_1$, and $1-\alpha_2$, respectively.

Initial power, calculated by using NEBF, of the second sub resource block group in the antenna 1 to the antenna 6 are 1, 1, 1, 1, 1, and 1, respectively.

To further improve the power utilization ratio of the network device, the remaining power may be shared to the second sub resource block group for use, so that a sum of power of the first sub resource block group and power of the second sub resource block group in a same antenna is equal to maximum power of the same antenna. In this case, power of the second sub resource block group in the antenna 1 to the antenna 6 are 1, 1, 1, $2-\alpha_0$, $2-\alpha_1$, and $2-\alpha_2$, respectively.

In some embodiments of this application, power sharing may be implemented between a plurality of sub resource block groups in a same antenna in the network device, so that a sum of power of the plurality of sub resource block groups in the same antenna reaches maximum power of the antenna, thereby improving a power utilization ratio of the antenna in the network device, and implementing optimal performance. This effectively improves a power utilization ratio of downlink data sending in the network device, effectively improves spectral efficiency of a cell, and improves an average throughput of the cell.

With reference to the first aspect, in a possible implementation of the first aspect, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

An example in which the sub resource block group includes a first user and a second user is used for description. The first user is a user sensitive to a weight direction change, for example, a TM4 user. The second user is a user insensitive to a weight direction change, for example, a TM9 user.

First, the network device calculates normalized power of the sub resource block group by using PEBF or NEBF, and then obtains power values of different users in the sub resource block group at different layers of a same antenna. For example, the network device includes a layer 1 to a layer 6 (the layer is a physical layer), maximum power of each layer is 2, and power corresponding to each user at each layer is equal (maximum power of each user at each layer is 1).

Power utilization ratios of the first user at the layer 1 to the layer 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1. In this case, initial power of the first user at the layer 1 to the layer 6 is 1, 1, 1, $\alpha_0$, $\alpha_1$, and $\alpha_2$, respectively. Remaining power of the first user at the layer 1 to the layer 6 is 0, 0, 0, $1-\alpha_0$, $1-\alpha_1$, and $1-\alpha_2$, respectively.

Because the first user is a user sensitive to a weight direction change, and the first user is characterized in that a channel estimation value based on a pilot needs to be consistent with a channel estimation value of data, power of the first user does not need to be adjusted. Remaining power of the first user at a same layer of each antenna may be shared to the second user at the same layer of the same antenna, so that a sum of power of the first user and power of the second user in the same antenna is equal to maximum power of the same antenna.

The remaining power of the first user at the layer 1 to the layer 6 may be respectively 0, 0, 0, $1-\alpha_0$, $1-\alpha_1$, and $1-\alpha_2$, and may be shared to the second user, so that a sum of power of the first user and power of the second user in a same antenna is equal to maximum power of the same antenna. In this case, power of the second user at the layer 1 to the layer 6 is 1, 1, 1, $2-\alpha_0$, $2-\alpha_1$, and $2-\alpha_2$, respectively.

In some embodiments of this application, power sharing may be implemented between a plurality of users at a same layer of a same antenna of the network device, so that a sum of power of a first user and power of a second user in the same antenna is equal to maximum power of the same antenna, thereby improving a power utilization ratio of the network device, and implementing optimal performance. This effectively improves a power utilization ratio of downlink data sending in the network device, effectively improves spectral efficiency of a cell, and improves an average throughput of the cell.

With reference to the first aspect, in a possible implementation of the first aspect, the users scheduled in the sub resource block group include a first user and a second user, the first user is a user sensitive to a weight direction change, and the second user is a user insensitive to a weight direction change. Power of the first user is increased based on a modulation scheme of the first user. A sum of power of the first user after the increase and power of the second user is the same as a sum of the power of the first user before the increase and power of the second user.

Power of a user sensitive to a weight direction change in a same sub resource block group may be increased. The power increase means to increase an upper power limit of the user sensitive to the weight direction change. Power of each user is dynamically adjusted based on different modulation schemes of the user, to improve a power utilization ratio of the network device and improve a data throughput of the network device.

First, the network device calculates normalized power of the sub resource block group by using PEBF or NEBF, and then obtains power values of different users in the sub resource block group at different layers of a same antenna. For example, the network device includes a layer 1 to a layer 6 (the layer is a physical layer), and maximum power of each layer is 2. Users at each layer are grouped, for example, users can be grouped into a first user group and a second user group. The first user group includes one or more first users, the second user group includes one or more first users and one or more second users, and the first user in the first user group is different from the first user in the second user group. Maximum power of the first user group and maximum power of the second user group at each layer are the same, and both are 1.

Power utilization ratios of the first user group at the layer 1 to the layer 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1. In this case, initial power of the first user group at the layer 1 to the layer 6 is 1, 1, 1, $\alpha_0$, $\alpha_1$, and $\alpha_2$, respectively. Remaining power of the first user group at the layer 1 to the layer 6 is 0, 0, 0, $1-\alpha_0$, $1-\alpha_1$, and $1-\alpha_2$, respectively.

Because the first user is a user sensitive to a weight direction change, and the first user is characterized in that a channel estimation value based on a pilot needs to be consistent with a channel estimation value of data, impact of different modulation schemes on the first user needs to be considered. An upper increase limit of power of the first user varies with different modulation schemes.

The remaining power of the first user group at the layer 1 to the layer 6 is respectively 0, 0, 0, $1-\alpha_0$, $1-\alpha_1$, and $1-\alpha_2$, and may be shared to the first user in the second user group, to increase power of the first user in the second user group. In a same antenna, a sum of power of the first user after the increase and power of the second user is equal to a sum of the power of the first user before the increase and power of the second user, and is equal to maximum power of the same antenna. In this case, power of the second user group at the layer 1 to the layer 6 is 1, 1, 1, $2-\alpha_0$, $2-\alpha_1$, and $2-\alpha_2$, respectively.

In some embodiments of this application, power of a user sensitive to a weight direction change in a same sub resource block group may be increased. The power increase means to increase an upper power limit of the user sensitive to the weight direction change. Power of each user is dynamically adjusted based on different modulation schemes of the user, to improve a power utilization ratio of the network device and improve a data throughput of the network device. The power utilization ratio of the network device is improved, thereby implementing optimal performance. This effectively improves a power utilization ratio of downlink data sending in the network device, effectively improves spectral efficiency of a cell, and improves an average throughput of the cell.

With reference to the first aspect, in a possible implementation of the first aspect, the increasing power of the first user based on a modulation scheme of the first user includes: when the modulation scheme of the first user is quadrature phase shift keying QPSK, an upper increase limit of the power of the first user is one time a maximum power threshold; when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

It may be understood that, for different modulation schemes, the upper increase limit of the power of the first user may be implemented in other manners. For example, when the modulation scheme of the first user is quadrature phase shift keying QPSK, the upper increase limit of the power of the first user is 1.5 times a maximum power threshold. When the modulation scheme of the first user is 16 quadrature amplitude modulation QAM, the upper increase limit of the power of the first user is 1.8 times the maximum power threshold. This is not limited herein.

The maximum power threshold is a preset power threshold, and the maximum power threshold corresponds to a modulation scheme. When power exceeds the maximum power threshold, demodulation performance of a constellation point corresponding to the modulation scheme is easily degraded.

In a possible implementation, in a same sub resource block group, power of a first user (for example, a TM4 user) is increased, and an upper power limit of a second user (for example, a TM9 user) is decreased, to keep total power of users (or a sum of power of users) in the same sub resource block group unchanged.

In a possible implementation, an example in which first users in a same sub resource block group include a first user A, a first user B, and a first user C is used for description. Power of a part (for example, the first user A) of the first users is increased, and an upper power limit of another user in the first users is decreased (for example, an upper power limit of the first user B is decreased, or an upper power limit of the first user C is decreased, or upper power limits of the first user B and the first user C are both decreased), to keep total power of users (or a sum of power of users) in the same sub resource block group unchanged.

According to a second aspect, an embodiment of this application provides a communications apparatus, including:

a processing module, configured to determine X sub resource block groups based on a scheduled resource block group, where one of the X sub resource block groups includes a part of the resource block group, all resource block groups in each sub resource block group are occupied by a user, and X is a positive integer greater than 1, where the processing module is further configured to determine, based on the X sub resource block groups, a beamforming weight calculation method used for each sub resource block group, where the beamforming weight calculation method includes normalized-eigen beamforming NEBF or power limited-eigen beamforming PEBF;

the processing module is further configured to obtain, based on the beamforming weight calculation method corresponding to each sub resource block group, a beamforming weight corresponding to the sub resource block group; and the processing module is further configured to weight data based on the beamforming weight; and a transceiver module, configured to send weighted data.

In a possible implementation, the processing module is further configured to detect a number of users scheduled in the sub resource block group;

the processing module is further configured to: when a single user is scheduled in the sub resource block group, determine that NEBF is used for the sub resource block group; and the processing module is further configured to: when multiple users are scheduled in the sub resource block group, detect whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

In a possible implementation, the processing module is further configured to: when the users scheduled in the sub resource block group include a user sensitive to a weight direction change, skip calculating the beamforming weight of the user sensitive to the weight direction change in the sub resource block group.

In a possible implementation, the processing module is further configured to calculate average transmit power of an NEBF set by using NEBF, where the NEBF set includes one or more sub resource block groups, and the beamforming weight is calculated for the sub resource block group in the NEBF set by using NEBF;

the processing module is further configured to calculate weight power of the NEBF set on an $n^{th}$ antenna by using NEBF, where n is an integer greater than or equal to 0;

the processing module is further configured to determine average transmit power of the NEBF set on the $n^{th}$ antenna based on the average transmit power of the NEBF set and the weight power of the NEBF set on the $n^{th}$ antenna; and the processing module is further configured to perform, based on the average transmit power of the NEBF set on the $n^{th}$ antenna, normalization processing on a weight corresponding to the sub resource block group in the NEBF set, to obtain the beamforming weight corresponding to the sub resource block group.

In a possible implementation, the processing module is further configured to calculate average transmit power of a PEBF set by using PEBF, where the PEBF set includes one or more sub resource block groups, and the beamforming weight is calculated for the sub resource block group in the PEBF set by using PEBF;

the processing module is further configured to calculate weight power of the PEBF set on an $n^{th}$ antenna by using PEBF, where n is an integer greater than or equal to 0;

the processing module is further configured to determine average transmit power of the PEBF set on the $n^{th}$ antenna based on the average transmit power of the PEBF set and the weight power of the PEBF set on the $n^{th}$ antenna; and the processing module is further configured to perform, based on the average transmit power of the PEBF set on the $n^{th}$ antenna, normalization processing on a weight corresponding to the sub resource block group in the PEBF set, to obtain the beamforming weight corresponding to the sub resource block group.

In a possible implementation, the processing module is further configured to determine first weight power of the sub resource block group, where the first weight power is weight power calculated for the sub resource block group by using PEBF;

the processing module is further configured to determine second weight power of the sub resource block group, where the second weight power is weight power calculated for the sub resource block group by using NEBF;

the processing module is further configured to calculate a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

the processing module is further configured to determine, based on the sum of the signal to interference plus noise ratio differences of the users in the sub resource block group, a sum of signal to interference plus noise ratio differences of the X sub resource block groups;

the processing module is further configured to: when the sum of the signal to interference plus noise ratio differences of the X sub resource block groups is greater than 0, determine that a beamforming weight calculation method used for the X sub resource block groups is PEBF; and the processing module is further configured to: when the sum of the signal to interference plus noise ratio differences of the X sub resource block groups is less than or equal to 0, determine that the beamforming weight calculation method used for the X sub resource block groups is NEBF.

In a possible implementation, the processing module is further configured to perform enhanced zero-forcing processing on the first weight power and the second weight power of the sub resource block group, and calculate power of each row of antennas based on the first weight power on which the enhanced zero-forcing processing is performed and the second weight power on which the enhanced zero-forcing processing is performed;

the processing module is further configured to calculate a power utilization ratio based on a sum of power of all antennas in the power of each row of antennas and maximum power in the power of each row of antennas;

the processing module is further configured to calculate power correlation of the power of each row of antennas based on the power of each row of antennas and a full-power multi-user weight vector;

the processing module is further configured to calculate a signal to interference plus noise ratio difference of an $1^{th}$ user in the sub resource block group based on the power correlation and the power utilization ratio, where 1 is a positive integer; and the processing module is further configured to calculate the sum of the signal to interference plus noise ratio differences of the users in the sub resource block group.

In a possible implementation, the processing module is further configured to calculate initial power of a first sub resource block group by using PEBF;

the processing module is further configured to calculate initial power of a second sub resource block group by using NEBF; and the processing module is further configured to determine power of the first sub resource block group and power of the second sub resource block group based on the initial power of the first sub resource block group and the initial power of the second sub resource block group, where a sum of power of the first sub resource block group and power of the second sub resource block group in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and the processing module is further configured to increase power of the first user based on a modulation scheme of the first user, where a sum of power of the first user after the increase and power of the second user is the same as a sum of the power of the first user before the increase and power of the second user.

In a possible implementation, when the modulation scheme of the first user is quadrature phase shift keying QPSK, an upper increase limit of the power of the first user is one time a maximum power threshold;

when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

According to a third aspect, an embodiment of this application provides a communications apparatus, including:

a processor, configured to determine X sub resource block groups based on a scheduled resource block group, where one of the X sub resource block groups includes a part of the resource block group, all resource block groups in each sub resource block group are occupied by a user, and X is a positive integer greater than 1, where the processor is further configured to determine, based on the X sub resource block groups, a beamforming weight calculation method used for each sub resource block group, where the beamforming weight calculation method includes normalized-eigen beamforming NEBF or power limited-eigen beamforming PEBF;

the processor is further configured to obtain, based on the beamforming weight calculation method corresponding to each sub resource block group, a beamforming weight corresponding to the sub resource block group; and the processor is further configured to weight data based on the beamforming weight; and a transceiver, configured to send weighted data.

In a possible implementation, the processor is further configured to detect a number of users scheduled in the sub resource block group;

the processor is further configured to: when a single user is scheduled in the sub resource block group, determine that NEBF is used for the sub resource block group; and the processor is further configured to: when multiple users MU are scheduled in the sub resource block group, detect whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

In a possible implementation, the processor is further configured to: when the users scheduled in the sub resource block group include a user sensitive to a weight direction change, skip calculating the beamforming weight of the user sensitive to the weight direction change in the sub resource block group.

In a possible implementation, the processor is further configured to calculate average transmit power of an NEBF set by using NEBF, where the NEBF set includes one or more sub resource block groups, and the beamforming weight is calculated for the sub resource block group in the NEBF set by using NEBF;

the processor is further configured to calculate weight power of the NEBF set on an $n^{th}$ antenna by using NEBF, where n is an integer greater than or equal to 0;

the processor is further configured to determine average transmit power of the NEBF set on the $n^{th}$ antenna based on the average transmit power of the NEBF set and the weight power of the NEBF set on the $n^{th}$ antenna; and the processor is further configured to perform, based on the average transmit power of the NEBF set on the $n^{th}$ antenna, normalization processing on a weight corresponding to the sub resource block group in the NEBF set, to obtain the beamforming weight corresponding to the sub resource block group.

In a possible implementation, the processor is further configured to calculate average transmit power of a PEBF set by using PEBF, where the PEBF set includes one or more sub resource block groups, and the beamforming weight is calculated for the sub resource block group in the PEBF set by using PEBF;

the processor is further configured to calculate weight power of the PEBF set on an $n^{th}$ antenna by using PEBF, where n is an integer greater than or equal to 0;

the processor is further configured to determine average transmit power of the PEBF set on the $n^{th}$ antenna based on the average transmit power of the PEBF set and the weight power of the PEBF set on the $n^{th}$ antenna; and the processor is further configured to perform, based on the average transmit power of the PEBF set on the $n^{th}$ antenna, normalization processing on a weight corresponding to the sub resource block group in the PEBF set, to obtain the beamforming weight corresponding to the sub resource block group.

In a possible implementation, the processor is further configured to determine first weight power of the sub resource block group, where the first weight power is weight power calculated for the sub resource block group by using PEBF;

the processor is further configured to determine second weight power of the sub resource block group, where the second weight power is weight power calculated for the sub resource block group by using NEBF;

the processor is further configured to calculate a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

the processor is further configured to determine, based on the sum of the signal to interference plus noise ratio differences of the users in the sub resource block group, a sum of signal to interference plus noise ratio differences of the X sub resource block groups;

the processor is further configured to: when the sum of the signal to interference plus noise ratio differences of the X sub resource block groups is greater than 0, determine that a beamforming weight calculation method used for the X sub resource block groups is PEBF; and the processor is further configured to: when the sum of the signal to interference plus noise ratio differences of the X sub resource block groups is less than or equal to 0, determine that the beamforming weight calculation method used for the X sub resource block groups is NEBF.

In a possible implementation, the processor is further configured to perform enhanced zero-forcing processing on the first weight power and the second weight power of the sub resource block group, and calculate power of each row of antennas based on the first weight power on which the enhanced zero-forcing processing is performed and the second weight power on which the enhanced zero-forcing processing is performed;

the processor is further configured to calculate a power utilization ratio based on a sum of power of all antennas in the power of each row of antennas and maximum power in the power of each row of antennas;

the processor is further configured to calculate power correlation of the power of each row of antennas based on the power of each row of antennas and a full-power multi-user weight vector;

the processor is further configured to calculate a signal to interference plus noise ratio difference of an $l^{th}$ user in the sub resource block group based on the power correlation and the power utilization ratio, where 1 is a positive integer; and the processor is further configured to calculate the sum of the signal to interference plus noise ratio differences of the users in the sub resource block group.

In a possible implementation, the processor is further configured to calculate initial power of a first sub resource block group by using PEBF;

the processor is further configured to calculate initial power of a second sub resource block group by using NEBF; and the processor is further configured to determine power of the first sub resource block group and power of the second sub resource block group based on the initial power of the first sub resource block group and the initial power of the second sub resource block group, where a sum of power of the first sub resource block group and power of the second sub resource block group in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and the processor is further configured to increase power of the first user based on a modulation scheme of the first user, where a sum of power of the first user after the increase and power of the second user is the same as a sum of the power of the first user before the increase and power of the second user.

In a possible implementation, when the modulation scheme of the first user is quadrature phase shift keying QPSK, an upper increase limit of the power of the first user is one time a maximum power threshold;

when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

According to a fourth aspect, an embodiment of this application provides a communications apparatus. The communications apparatus may implement functions performed by a network device or a terminal device in the method in the first aspect. The communications apparatus includes a processor, a memory, a receiver connected to the processor, and a transmitter connected to the processor. The memory is configured to store program code, and transmit the program code to the processor. The processor is configured to drive, according to instructions in the program code, the receiver and the transmitter to perform the method in the first aspect. The receiver and the transmitter are connected to the processor, to perform operations of the network device or the terminal device in the methods in the foregoing aspects. The transmitter may perform a sending operation, and the receiver may perform a receiving operation. Optionally, the receiver and the transmitter may be a radio frequency circuit, and the radio frequency circuit receives and sends messages through an antenna. Alternatively, the receiver and the transmitter may be a communications interface, the processor is connected to the communications interface through a bus, and the processor receives or sends messages through the communications interface.

According to a fifth aspect, an embodiment of this application provides a communications system, including a transmitting end and a receiving end.

The transmitting end performs the method in the first aspect, and the receiving end is configured to receive data from the transmitting end.

Optionally, the transmitting end may be a network device, and the receiving end may be another network device or a terminal device.

Optionally, the transmitting end may be a terminal device, and the receiving end may be another terminal device or a network device.

According to a sixth aspect, an embodiment of this application provides a computer-readable storage medium storing one or more computer-executable instructions. When the computer-executable instruction is executed by a processor, the processor performs any one of the possible implementations of the first aspect.

According to a seventh aspect, an embodiment of this application provides a computer program product (or referred to as a computer program) storing one or more computer-executable instructions. When the computer-executable instruction is executed by a processor, the processor performs any one of the possible implementations of the first aspect.

According to an eighth aspect, this application provides a chip system. The chip system includes a processor, configured to support a computer device in implementing functions in the foregoing aspects. In a possible design, the chip system further includes a memory. The memory is configured to store program instructions and data for the computer device. The chip system may include a chip, or may include a chip and another discrete component.

According to a ninth aspect, an embodiment of this application provides a chip system. The chip system includes at least one processor and a communications interface, the communications interface and the at least one processor are interconnected through a line, and the at least one processor is configured to run a computer program or instructions, to perform the method in the first aspect.

The communications interface in the chip system may be an input/output interface, a pin, a circuit, or the like.

BRIEF DESCRIPTION OF DRAWINGS

FIG. 5 is a diagram of power in a beamforming weight calculation method according to an embodiment of this application;

FIG. 6 is a diagram of power in a beamforming weight calculation method according to an embodiment of this application;

FIG. 7 is a diagram of power in a beamforming weight calculation method according to an embodiment of this application;

DESCRIPTION OF EMBODIMENTS

Figure 1A:
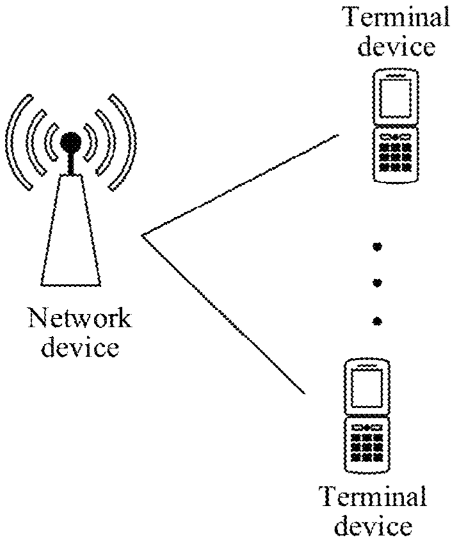
FIG. 1*a* is a diagram of an application scenario according to an embodiment of this application.

In the specification, claims, and accompanying drawings of this application, terms such as "first" and "second" are intended to distinguish between similar objects, but do not necessarily indicate a specific order or sequence. It should be understood that the terms used in such a way are interchangeable in proper circumstances, which is merely a discrimination manner used when objects having a same attribute are described in embodiments of this application. In addition, the terms "include", "comprise" and any other variants mean to cover non-exclusive inclusion, so that a process, method, system, product, or device that includes a series of units is not necessarily limited to those units, but may include other units not expressly listed or inherent to such a process, method, system, product, or device.

The following clearly describes technical solutions in embodiments of this application with reference to the accompanying drawings in embodiments of this application. In descriptions of this application, "/" means "or" unless otherwise specified. For example, A/B may indicate A or B. In this application, "and/or" describes only an association relationship for describing associated objects and indicates that three relationships may exist. For example, A and/or B may indicate the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a single item (piece) or any combination of a plurality of items (pieces). For example, at least one item (piece) of a, b, or c may indicate a, b, c, a and b, a and c, b and c, or a, b, and c, where a, b, and c may be in a singular form or a plural form.

The technical solutions in embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system or NR, and a future 6th generation communications system.

In the communications systems, a communications system operated by an operator may be referred to as an operator network. The operator network may also be referred to as a PLMN network, which is a network established and operated by a government or an operator approved by a government to provide a land mobile communications service for the public, and is mainly a public network in which a mobile network operator (MNO) provides a mobile broadband access service for a user. The operator network or the PLMN network described in embodiments of this application may be a network that meets a requirement of a 3rd generation partnership project (3GPP) standard, which is referred to as a 3GPP network for short. Generally, the 3GPP network is operated by an operator, and includes but is not limited to a 5G mobile communications network (referred to as a 5G network for short), a 4th generation (4G) mobile communications network (referred to as a 4G network for short), or a 3rd generation (3G) mobile communications technology network (referred to as a 3G network for short). The 3GPP network further includes a future 6G network. For ease of description, an operator network (for example, a MNO network) is used as an example for description in embodiments of this application.

For ease of understanding embodiments of this application, some application scenarios of this solution are described. FIG. 1*a* is a diagram of an application scenario according to an embodiment of this application. In an optional implementation, a transmitting end in embodiments of this application may be a network device, and a receiving end may be a terminal device.

In embodiments of this application, the terminal device may also be referred to as user equipment (UE) or a user. As a device having a wireless transceiver function, the terminal device in embodiments of this application may communicate with one or more core networks (CN) via the network device. The terminal device may also be referred to as an access terminal, a terminal, a subscriber unit, a subscriber station, a mobile station, a mobile, a remote station, a remote terminal, a mobile device, a user terminal, a wireless network device, a user agent, a user apparatus, or the like. The terminal device may be deployed on land, including indoor, outdoor, handheld, or in-vehicle forms, or may be deployed on a water surface (such as a ship), or may be deployed in air (for example, on an airplane, a balloon, or a satellite). The terminal device may be a cellular phone, a cordless phone, a session initiation protocol (SIP) phone, a smartphone, a mobile phone, a wireless local loop (WLL) station, a personal digital assistant (PDA), a handheld device having a wireless communications function, a computing device or another device connected to a wireless modem, an in-vehicle device, a wearable device, an uncrewed aerial vehicle device, a terminal in an internet of things or an internet of vehicles, a terminal in any form in a 5G network and a future network, relay user equipment, a terminal in a future evolved public land mobile network (PLMN), or the like. The relay user equipment may be, for example, a 5G residential gateway (RG). For example, the terminal device may be a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, or a wireless terminal in a smart home. This is not limited in embodiments of this application.

The network device may provide a subnet of an operator network, for example, provide an implementation system between a service node and a terminal device in the operator network. To access the operator network, the terminal device first passes through the network device, and then may be connected to the service node of the operator network through the network device. The network device in embodiments of this application is a device that provides a wireless communications function for a terminal device, and may also be referred to as a (radio) access network ((R)AN) device. The network device includes but is not limited to a next generation node base station (gNB) in a 5G system, an evolved nodeB (eNB) in LTE, a radio network controller (RNC), a nodeB (NB), a base station controller (BSC), a base transceiver station (BTS), a home base station (HNB), a baseband unit (BBU), a transmitting and receiving point (TRP), a transmitting point (TP), a pico base station device, a mobile switching center, a network device in a future network, or the like. In systems using different radio access technologies, devices with an access network device function may have different names.

Figure 1B:
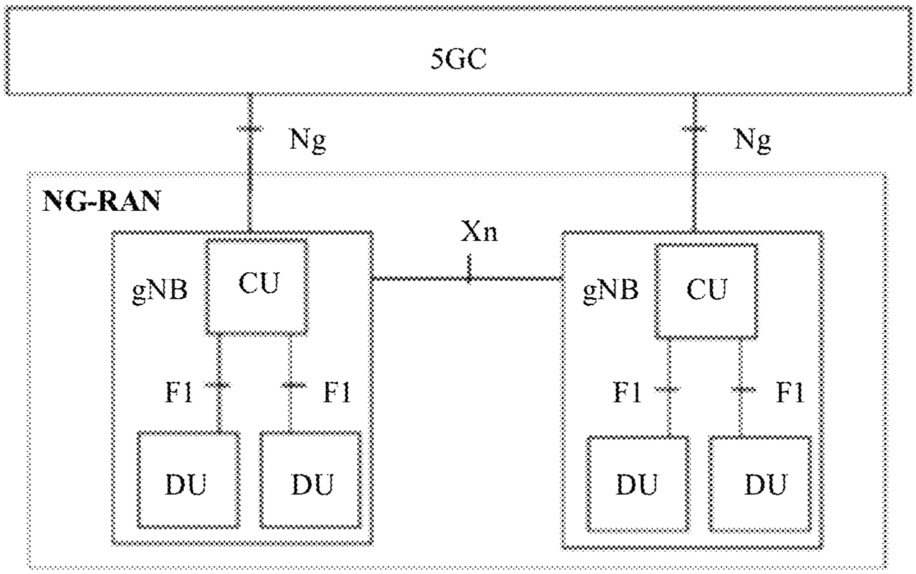
FIG. 1*b* is a diagram of a CU-DU architecture used in a communications system.

FIG. 1*b* is a diagram of a CU-DU architecture used in a communications system. As shown in FIG. 1*b*, an access network device may include a central unit (CU) and a distributed unit (DU). Optionally, the access network device may further include a radio unit (RU) (not shown in the figure). An open radio access network (O-RAN) may include one or more network elements in the CU-DU architecture. Functions of the access network device are split. Some functions of the access network device are deployed on a CU, and other functions of the access network device are deployed on a DU. There may be one or more DUs. A plurality of DUs may share one CU, to reduce costs and facilitate network extension. The CU and the DU are connected through an interface (for example, an F1 interface). The CU represents that the access network device is connected to a core network through an interface (for example, an Ng interface). Functions of the CU and the DU may be divided based on a protocol stack. In a possible manner, a radio resource control (RRC) layer, a packet data convergence protocol (PDCP) layer, and a service data adaptation protocol (SDAP) layer are deployed on the CU. A radio link control (RLC) layer, a media access control (MAC) layer, and a physical layer (PHY) are deployed on the DU. Correspondingly, the CU is capable of processing the RRC layer, the PDCP layer, and the SDAP layer. The DU is capable of processing the RLC layer, the MAC layer, and the PHY layer. It should be noted that the foregoing function division is merely an example, and there may be another division manner. For example, the CU is capable of processing the RRC layer, the PDCP layer, the RLC layer, and the SDAP layer, and the DU is capable of processing the MAC layer and the PHY layer. For another example, the CU is capable of processing the RRC layer, the PDCP layer, the RLC layer, the SDAP layer, and a part of the MAC layer (for example, adding a MAC header), and the DU is capable of processing the PHY layer and a part of the MAC layer (for example, scheduling). Names of the CU and the DU may change, and any access network node that can implement the foregoing functions may be considered as the CU and the DU in this application.

Figure 1C:
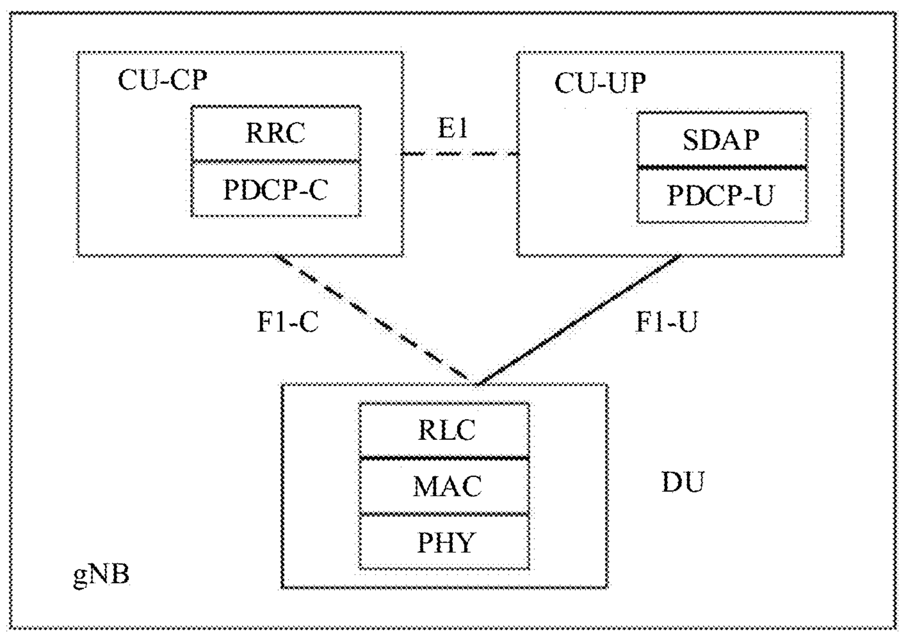
FIG. 1*c* is a diagram of an architecture of a CU.

FIG. 1*c* is a diagram of an architecture of the CU. As shown in FIG. 1*c*, the CU includes a control plane CU (CU-CP) and a user plane CU (CU-UP). The CU-CP and the CU-UP may be deployed on different physical devices. Alternatively, the CU-CP and the CU-UP may be deployed on a same physical device. The CU-CP and the CU-UP are connected through an interface (for example, an E1 interface). The CU-CP represents that the access network device is connected to a core network through an interface (for example, an Ng interface). The CU-CP is connected to the DU through an interface (for example, an F1-C interface), and the CU-UP is connected to the DU through an interface (for example, an F1-U interface). There may be one CU-CP, and there may be one or more CU-UPs. A plurality of CU-UPs may share one CU-CP. The CU-CP mainly has a control plane function. The CU-UP mainly has a user plane function. In a possible implementation, for a 5G access network device, the RRC layer may be deployed on the CU-CP, but the SDAP layer is not deployed on the CU-CP. The CU-CP may further have some control plane functions of the PDCP layer, for example, may process a signaling radio bearer (SRB). The SDAP layer may be deployed on the CU-UP, but the RRC layer is not deployed on the CU-UP. The CU-UP may further have some user plane functions of the PDCP layer, for example, process a data radio bearer (DRB). Specific division of the protocol stack between the CU-UP and the DU is not limited. In this application, PDCP-U processing is required to be a logical function of the CU-UP.

The foregoing network elements may be network elements implemented on dedicated hardware, or may be software instances run on dedicated hardware, or may be instances that implement a virtualization function on a proper platform. For example, the foregoing virtualization platform may be a cloud platform.

A beamforming weight calculation method provided in this application may be applied to various communications systems, which, for example, may be an internet of things (IoT), a narrowband internet of things (NB-IoT), LTE, a 5G communications system, an LTE-5G hybrid architecture, a 5G new radio (NR) system, or a new communications system emerging in future communications development. The 5G communications system in this application may include at least one of a non-standalone (NSA) 5G communications system and a standalone (SA) 5G communications system. Alternatively, the communications system may be a PLMN network, a device-to-device (D2D) network, a machine-to-machine (M2M) network, or another network.

In addition, embodiments of this application are also applicable to another future-oriented communications technology, for example, 6G. Network architectures and service scenarios described in this application are intended to describe the technical solutions in this application more clearly, and do not constitute a limitation on the technical solutions provided in this application. A person of ordinary skill in the art may be aware that, with evolution of network architectures and emergence of new service scenarios, the technical solutions provided in this application are also applicable to similar technical problems.

Figure 2:
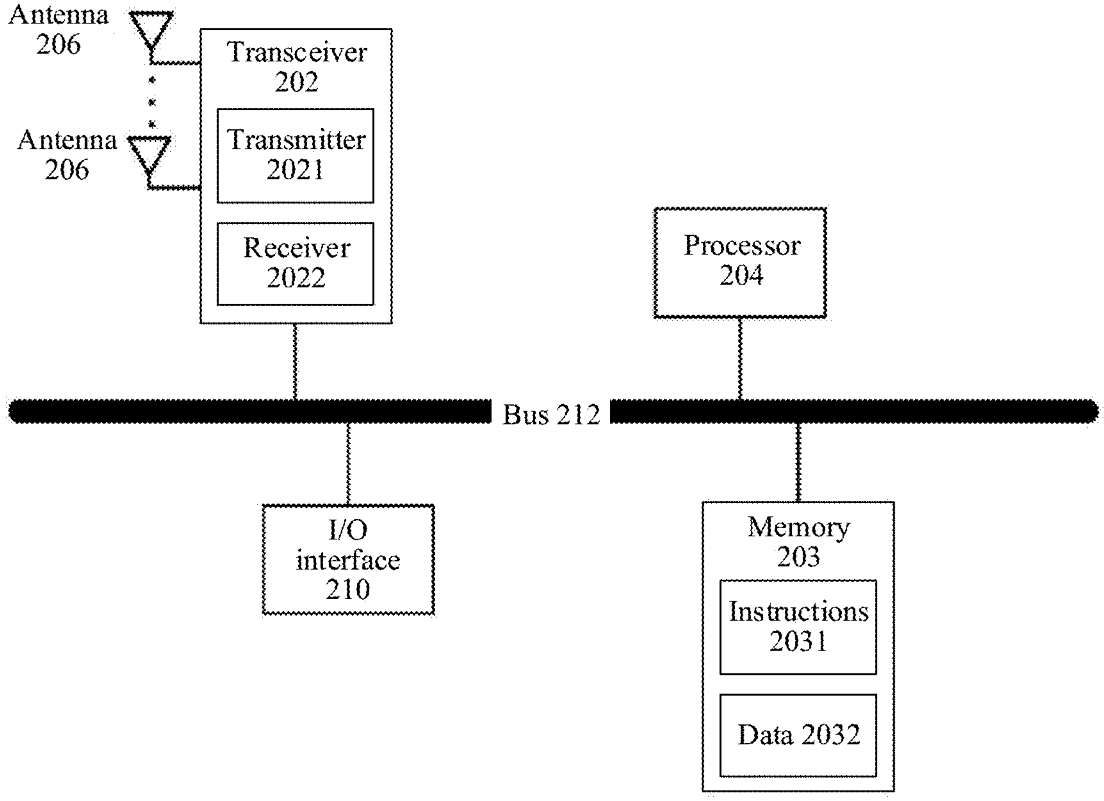
FIG. 2 is a diagram of a hardware structure of a communications apparatus according to an embodiment of this application.

FIG. 2 is a diagram of a hardware structure of a communications apparatus according to an embodiment of this application. The communications apparatus may be a possible implementation of the network device in embodiments of this application, or may be a possible implementation of the terminal device in embodiments of this application. As shown in FIG. 2, the communications apparatus includes at least a processor 204, a memory 203, and a transceiver 202. The memory 203 is further configured to store instructions 2031 and data 2032. Optionally, the communications apparatus may further include antennas 206, an input/output (I/O) interface 210, and a bus 212. The transceiver 202 further includes a transmitter 2021 and a receiver 2022. In addition, the processor 204, the transceiver 202, the memory 203, and the I/O interface 210 are communicatively connected to each other through the bus 212, and the antennas 206 are connected to the transceiver 202.

The processor 204 may be a general-purpose processor, for example but not limited to, a central processing unit (CPU), or may be a special-purpose processor, for example but not limited to, a digital signal processor (DSP), an application-specific integrated circuit (ASIC), or a field programmable gate array (FPGA). Alternatively, the processor 204 may be a neural processing unit (NPU). In addition, the processor 204 may alternatively be a combination of a plurality of processors. Particularly, in the technical solutions provided in embodiments of this application, the processor 204 may be configured to perform a related step of a beamforming weight calculation method in a subsequent method embodiment. The processor 204 may be a processor that is specially designed to perform the foregoing step and/or operation, or may be a processor that performs the foregoing step and/or operation by reading and executing the instructions 2031 stored in the memory 203. The processor 204 may need to use the data 2032 when performing the foregoing step and/or operation.

The transceiver 202 includes the transmitter 2021 and the receiver 2022. In an optional implementation, the transmitter 2021 is configured to send a signal through the antenna 206. The receiver 2022 is configured to receive a signal through at least one of the antennas 206. Particularly, in technical solutions provided in embodiments of this application, the transmitter 2021 may be configured to use at least one of the antennas 206 to perform, for example, an operation performed by a receiving module or a sending module in the network device when a beamforming weight calculation method in a subsequent method embodiment is applied to the network device.

The transceiver 202 may be configured to support receiving or sending of an air interface signal between network devices, between terminal devices, and between a network device and a terminal device. The transceiver 202 may be connected to a plurality of antennas. The transceiver 202 includes a transmitter Tx and a receiver Rx. One or more antennas may receive an air interface signal, and the receiver Rx of the transceiver 202 is configured to: receive the air interface signal from the antenna, convert the air interface signal into a digital baseband signal or a digital intermediate frequency signal, and provide the digital baseband signal or the digital intermediate frequency signal to the processor 204, so that the processor 204 performs further processing, for example, demodulation processing and decoding processing, on the digital baseband signal or the digital intermediate frequency signal. In addition, the transmitter Tx of the transceiver 202 is further configured to: receive a modulated digital baseband signal or digital intermediate frequency signal from the processor 204, convert the modulated digital baseband signal or digital intermediate frequency signal into an air interface signal, and send the air interface signal through one or more antennas.

In embodiments of this application, the transceiver 202 is configured to support the communications apparatus in performing the foregoing receiving function and sending function. A processor having a processing function is considered as the processor 204. The receiver 2022 may also be referred to as an input port, a receiving circuit, or the like, and the transmitter 2021 may be referred to as a transmitting port, a transmitting circuit, or the like.

The processor 204 may be configured to execute the instructions stored in the memory 203, to control the transceiver 202 to receive a message and/or send a message, to complete functions of the communications apparatus in method embodiments of this application. In an implementation, it may be considered that a function of the transceiver 202 is implemented by using a transceiver circuit or a dedicated transceiver chip. In embodiments of this application, that the transceiver 202 receives a message may be understood as that a message is input to the transceiver 202, and that the transceiver 202 sends a message may be understood as that the transceiver 202 outputs a message.

The memory 203 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 203 is configured to store the instructions 2031 and the data 2032. The processor 204 may perform steps and/or operations in the method embodiments of this application by reading and executing the instructions 2031 stored in the memory 203. The data 2032 may need to be used when the operations and/or steps in the method embodiments of this application are performed.

Optionally, the communications apparatus may further include the I/O interface 210. The I/O interface 210 is configured to receive instructions and/or data from a peripheral device, and output instructions and/or data to the peripheral device.

The communications apparatus may be a chip, a network device, a terminal device, or the like. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver module may be a transceiver, a radio frequency chip, or the like.

In a possible design, the communications apparatus includes a means for generating data and a means for sending data. Functions of the means for generating data and the means for sending data may be implemented by using one or more processors. For example, data may be generated by using one or more processors, and the data may be sent by using a transceiver, an input/output circuit, or an interface of a chip. For the data, refer to related descriptions in embodiments of this application.

In a possible design, the communications apparatus includes a means for receiving data and a means for sending uplink data. For the data and how to send the uplink data based on the data, refer to related descriptions in embodiments of this application. For example, the data may be received by using a transceiver, an input/output circuit, or an interface of a chip.

For ease of understanding embodiments of this application, the following first briefly describes several terms in this application.

1. Beamforming Weight Calculation Method

In a multi-user multiple-input multiple-output (MU-MIMO) system, to avoid impact on orthogonality between multiple users caused when transmit power of an antenna exceeds a maximum value, a network device generally performs maximum transmit power normalization processing on transmit power of a plurality of antennas by using a beamforming weight calculation method, to obtain a beamforming weight. The network device weights data based on the beamforming weight, and then sends weighted data.

Currently, commonly used beamforming calculation methods include: power limited-eigen beamforming (PEBF) and normalized-eigen beamforming (NEBF).

2. PEBF

PEBF can ensure that power of a maximum-power antenna port does not overrun. The following describes an example calculation procedure of PEBF:

A multi-user weight (MU weight, referred to as a weight for short below) corresponding to a $j^{th}$ resource block group (RBG) is used as an example for description. The weight is used to perform weighting processing on to-be-sent data, and j is a positive integer.

Multi-user weight: Because a plurality of users send data in a same resource block group, different weights need to be used when weighting operations need to be performed on different user data. In addition, weights of different users need to ensure that data interference between the users is minimized, or a data throughput is maximized. Therefore, the weight is also referred to as a multi-user weight. The weight is as follows:

$$W_{j,l}^{MU} = \left[W_{j,l}^{MU}(0), W_{j,l}^{MU}(1), \ldots , W_{j,l}^{MU}(M-1)\right]^T.$$

$$W_{j,l}^{MU}$$

is a weight of an $l^{th}$ layer in the $j^{th}$ RBG, the weight of the $l^{th}$ layer in the $j^{th}$ RBG is $$W_{j,l}^{MU} \in C^{M\times 1},$$

M is a positive integer, $$W_{j,l}^{MU}(n)$$

represents an n element of the vector $$W_{j,l}^{MU},$$

the $n^{th}$ element corresponds to a weight of an $n^{th}$ antenna, n is an integer greater than or equal to 0, n=0,1, . . . , M−1, M is an integer greater than 1, and M is a number of antenna ports of the network device.

It is assumed that an intermediate variable is as follows:

$$E_n = \sqrt{\frac{M}{\dfrac{\sum_{j=1}^{M_{BfRbgNum}} \sum_{l=1}^{L_{layer,j}} (p_{j,l} * PA_{j,l})}{\sum_{j=1}^{M_{BfRbgNum}} \sum_{l=1}^{L_{layer,j}} \left(\left\|W_{j,l}^{MU}(n)\right\|^2 * PA_{j,l}\right)}}}.$$

$N_{BfRbgNum}$ is a number of RBGs that are in the network device and for which a weight is calculated by using PEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a power allocation (PA) interface, $p_{j,l}$ is a power proportionality coefficient of an $l^{th}$ stream weight in the $j^{th}$ RBG in a current transmission time interval (TTI), the power proportionality coefficient is a percentage of power of the $l^{th}$ layer in total power of all layers, and $$\left\|W_{j,l}^{MU}(n)\right\|^2$$

is a power value of an $n^{th}$ element at the $l^{th}$ layer in the $j^{th}$ RBG.

Based on the intermediate variable $E_n$, a PEBF weight power adjustment factor $\tau_{PEBF}$ is calculated as follows:

$$\tau_{PEBF} = \frac{1}{\max(E_0, E_, \ldots , E_{M-1})}.$$

Based on the PEBF weight power adjustment factor $\tau_{PEBF}$, a beamforming weight $$W_j^{MU,PEBF}$$

of the $j^{th}$ RBG is obtained as follows:

$$W_j^{MU,PEBF} = \tau_{PEBF} \cdot W_j^{MU},\ j = 0, 1, \ldots, N_{BfRbgNum} - 1.$$

3. NEBF

NEBF can achieve that power of each antenna reaches a maximum power value of the antenna. The following describes an example calculation procedure of NEBF:

A weight corresponding to a $j^{th}$ RBG is used as an example for description. The weight is used to perform weighting processing on to-be-sent data, and j is a positive integer. The weight is as follows:

$$W_{j,l}^{MU} = \left[W_{j,l}^{MU}(0), W_{j,l}^{MU}(1), \ldots, W_{j,l}^{MU}(M-1)\right]^T.$$

$$W_{j,l}^{MU}$$

is a weight of an $l^{th}$ layer in the $j^{th}$ RBG, the weight of the $l^{th}$ layer in the $j^{th}$ RBG is $$W_{j,l}^{MU} \in C^{M\times 1},$$

M is a positive integer, $$W_{j,l}^{MU}(n)$$

represents an $n^{th}$ element of the vector $$W_{j,l}^{MU},$$

the $n^{th}$ element corresponds to a weight of an $n^{th}$ antenna, n is an integer greater than or equal to 0, and n=0,1, . . . , M−1.

It is assumed that an intermediate variable is as follows:

$$E_n = \sqrt{\frac{\dfrac{M}{\sum_{j=1}^{M_{BfRbgNum}} \sum_{l=1}^{L_{layer,j}} (p_{j,l} * PA_{j,l})}}{\sum_{j=1}^{M_{BfRbgNum}} \sum_{l=1}^{L_{layer,j}} \left(\left\|W_{j,l}^{MU}(n)\right\|^2 * PA_{j,l}\right)}}.$$

$N_{BfRbgNum}$ is a number of RBGs that are in the network device and for which a weight is calculated by using NEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, $p_{j,l}$ is a power proportionality coefficient of an $l^{th}$ stream weight in the $j^{th}$ RBG in a current TTI, the power proportionality coefficient is a percentage of power of the $l^{th}$ layer in total power of all layers, and $$\left\|W_{j,l}^{MU}(n)\right\|^2$$

is a power value of an $n^{th}$ element at the $l^{th}$ layer in the $j^{th}$ RBG.

A beamforming weight $$W_j^{MU,PEBF}$$

of the $j^{th}$ RBG is obtained based on the intermediate variable, and an $n^{th}$ row of elements in the beamforming weight $$W_j^{MU,PEBF} \text{ is } W_j^{MU,NEBF}(n):$$

$$W_j^{MU,PEBF}(n) = \frac{1}{E_n} \cdot W_j^{MU}(n),\ j = 0, 1, \ldots, N_{BfRbgNum} - 1.$$

In a MIMO system, considering that power of each antenna element is limited, a conventional unit resource element power normalization algorithm is limited in application in an actual system, and all antennas need to be normalized to power of a maximum-power antenna. As a result, power of another antenna other than the maximum-power antenna is not used for full-power sending, which leads to a waste of power. For example, a PEBF weight calculation method is used, and an average power utilization ratio is low. To resolve the foregoing problem, a current algorithm idea mainly includes an interior point iteration method and a subgradient optimal gradient descent method, which both have a risk of slow convergence or non-convergence, and are complex to implement. Some algorithms even aim to maximize a minimum user throughput, which may not necessarily maximize a throughput of a user.

Based on this, embodiments of this application provide a beamforming weight calculation method, to minimize interference between users and maximize a power utilization ratio. A plurality of sub resource block groups may be determined based on a scheduled resource block group. Users in each sub resource block group schedule a same resource block group. A beamforming weight calculation method used for each sub resource block group is determined based on the plurality of sub resource block groups. The beamforming weight calculation method includes NEBF or PEBF. Then, a beamforming weight corresponding to each sub resource block group is obtained based on the beamforming weight calculation method corresponding to the sub resource block group. Finally, data is weighted based on the beamforming weight, and weighted data is sent. According to the foregoing method, for each sub resource block group, a corresponding beamforming weight calculation method is adaptively determined, and a corresponding beamforming weight is obtained based on the determined beamforming calculation method, to implement optimal performance. This effectively improves a power utilization ratio of downlink data sending in a network device, effectively improves spectral efficiency of a cell, and improves an average throughput of the cell.

The following describes embodiments of this application in detail with reference to accompanying drawings. It should be noted that the beamforming weight calculation method provided in embodiments of this application may be applied to a network device, and may also be applied to a terminal device. The following describes this solution by using an example in which the beamforming weight calculation method is applied to a network device. An implementation of applying the beamforming weight calculation method to a terminal device is similar to an implementation of applying the beamforming weight calculation method to a network device. Details are not described herein again. Further, the beamforming weight calculation method may be applied to a chip of the network device or a chip of the terminal device. This is not limited in embodiments of this application.

Figure 3:
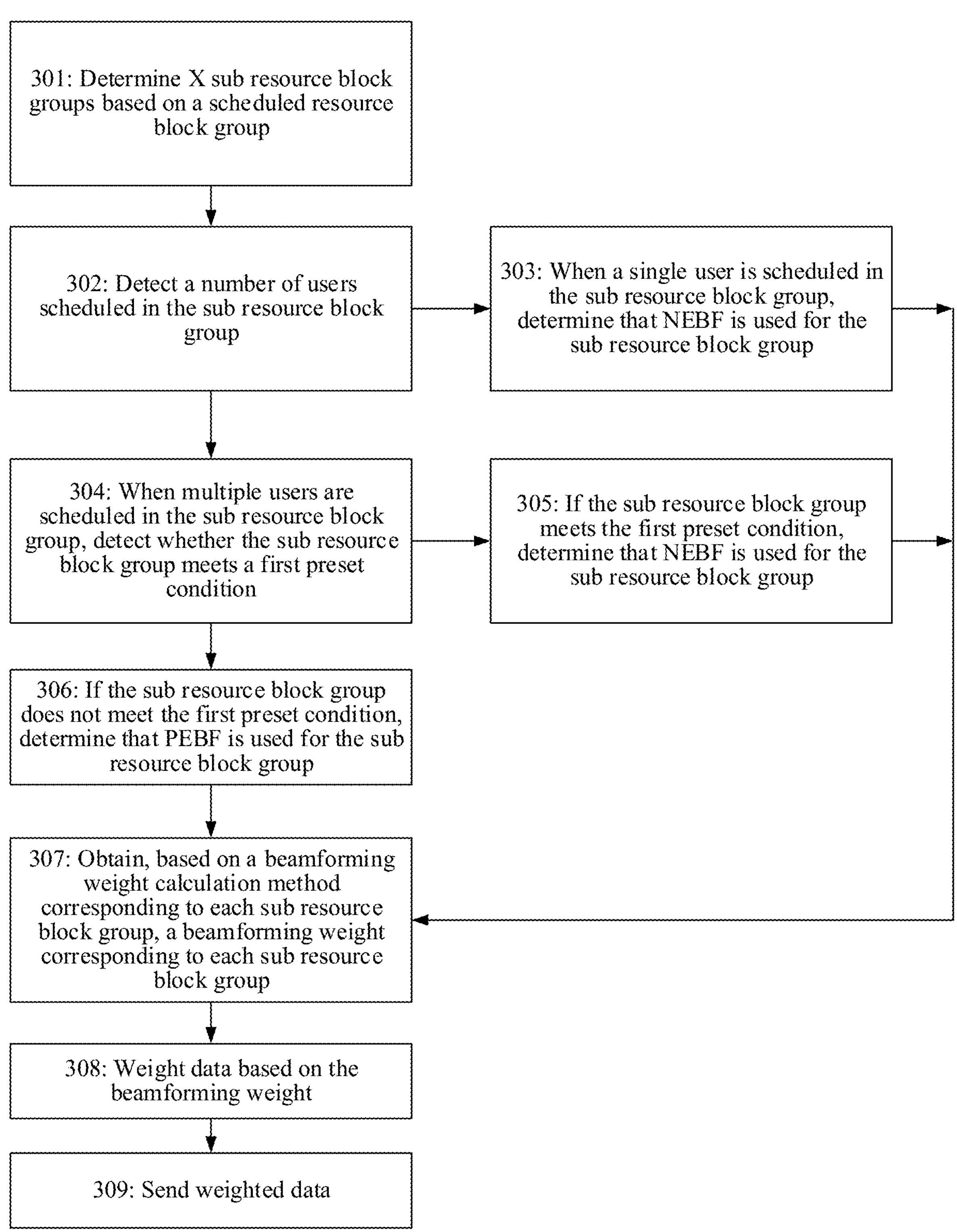
FIG. 3 is a diagram of an embodiment of a beamforming weight calculation method according to embodiments of this application.

Determining, based on a number of users in each sub resource block group, a beamforming weight calculation method corresponding to each sub resource block group is first described. FIG. 3 is a diagram of an embodiment of a beamforming weight calculation method according to embodiments of this application. The beamforming weight calculation method according to some embodiments of this application includes the following steps.

301: Determine X sub resource block groups based on a scheduled resource block group.

In step 301, a network device first determines a resource block group scheduled by each of one or more users managed by the network device. The scheduled resource block group may also be understood as a resource block group allocated by the network device to the user. Then, the network device determines X sub resource block groups based on the scheduled resource block group. One of the X sub resource block groups includes a part of the resource block group, all resource block groups in each sub resource block group are occupied by a user, and X is a positive integer greater than 1.

For example, in the case of X=2, two sub resource block groups determined based on the scheduled resource block group include a first sub resource block group and a second sub resource block group. A user in the first sub resource block group schedules an RBG 1, an RBG 2, and an RBG 3. A user in the second sub resource block group schedules an RBG 4, an RBG 5, and an RBG 6.

302: Detect a number of users scheduled in the sub resource block group.

In step 302, the network device detects a number of users scheduled in each of the X sub resource block groups. The network device determines, based on the number of users scheduled in each of the X sub resource block groups, a beamforming weight calculation method used for each sub resource block group.

For example, when one user is scheduled in the sub resource block group, the sub resource block is scheduled for a single user. When a plurality of users are scheduled in the sub resource block group, the sub resource block group is scheduled for multiple users (or referred to as that multiple users multiplex in the sub resource block group, or referred to as that the sub resource block group is scheduled for a plurality of users multiplexing).

When the sub resource block group is scheduled for multiple users, step 304 is performed. When the sub resource block group is scheduled for a single user, step 303 is performed.

303: When a single user is scheduled in the sub resource block group, determine that NEBF is used for the sub resource block group.

In step 303, when detecting that a single user is scheduled in the sub resource block group, the network device determines that a beamforming weight corresponding to the sub resource block group is obtained for the sub resource block group by using NEBF. In embodiments of this application, that a beamforming weight corresponding to the sub resource block group is obtained by using NEBF is also referred to as that a beamforming weight corresponding to the sub resource block group is calculated by using NEBF.

In embodiments of this application, an RBG for which a beamforming weight is calculated by using NEBF is referred to as an NEBF set. The NEBF set is also referred to as an NEBF RBG. The NEBF RBG includes one or more sub resource block groups, and for each sub resource block group in the NEBF RBG, the beamforming weight is calculated by using NEBF.

The network device groups sub resource block groups in which a single user is scheduled into an NEBF set (NEBF RBG). After determining that NEBF is used for the sub resource block group, the network device delivers the processing manner (of calculating the beamforming weight of the sub resource block by using NEBF) to a physical layer (the physical layer is also referred to as an L1 layer) through a MAC layer (the MAC layer is also referred to as an L2 layer).

When a single user is scheduled in the sub resource block group, it is determined that NEBF is used for the sub resource block group, and step 307 is performed. In step 307, the beamforming weight of the sub resource block group is obtained by using NEBF. For an example method for obtaining a beamforming weight by using NEBF, refer to the foregoing embodiment. Details are not described herein again.

304: When multiple users are scheduled in the sub resource block group, detect whether the sub resource block group meets a first preset condition.

In step 304, when the network device detects that multiple users are scheduled in the sub resource block group, the network device further detects whether the sub resource block group meets a first preset condition.

The first preset condition includes one or more of the following:

(A). An average modulation and coding scheme (MCS) of the multiple users in the sub resource block group is less than a first threshold.

(B). A difference between a first signal to interference plus noise ratio and a second signal to interference plus noise ratio is less than a second threshold. The first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF.

(C). Channel correlation or weight correlation between the users in the sub resource block groups is less than a third threshold.

The following separately provides descriptions.

(A) It is assumed that a number of users scheduled in a $j^{th}$ RBG is Nj. The users are MU paired users in an RBG, and the paired users multiplex a same frequency domain resource for data transmission. An MCS of an $i^{th}$ user in the $j^{th}$ RBG is $MCS_{i,j}$, and an average MCS of the multiple users in the $j^{th}$ RBG may be calculated according to the following formula:

$$MCS_{average,j} = \frac{1}{N_j}\sum_{i=1}^{N_j} MCS_{i,j}.$$

$MCS_{average,j}$ is the average MCS of the multiple users in the $j^{th}$ RBG.

When $MCS_{average,j}$ is less than a first threshold (Thr1, where the first threshold is referred to as Thr1 in embodiments of this application), the sub resource block group (the $j^{th}$ RBG) meets the first preset condition, and step 305 is performed. When $MCS_{average,j}$ is greater than or equal to the first threshold, the first preset condition is not met, and step 306 is performed. That is, when $MCS_{average,j}$<Thr1, the beamforming weight is calculated for the RBG by using NEBF; when $MCS_{average,j}$≥Thr1, the beamforming weight is calculated for the RBG by using PEBF.

(B). First, the network device calculates weight power of the sub resource block group by using NEBF. The obtained weight power is referred to as first weight power. The network device calculates weight power of the sub resource block group by using PEBF. The obtained weight power is referred to as second weight power. Then, the network device calculates a signal to interference plus noise ratio (SINR) based on the first weight power. The obtained signal to interference plus noise ratio is referred to as a first signal to interference plus noise ratio. The network device calculates a signal to interference plus noise ratio based on the second weight power. The obtained signal to interference plus noise ratio is referred to as a second signal to interference plus noise ratio. Next, the network device detects whether a difference (the difference is referred to as $\Delta SINR_{average}$ in embodiments of this application) between the first signal to interference plus noise ratio and the second signal to interference plus noise ratio is less than a second threshold (the second threshold is referred to as Thr2 in embodiments of this application). If the difference is less than the second threshold, the first preset condition is met, and step 305 is performed. If the difference is greater than or equal to the second threshold, the first preset condition is not met, and step 306 is performed. That is, when $\Delta SINR_{average}$<Thr2, the beamforming weight is calculated for the RBG by using NEBF; when $\Delta SINR_{average}$ ?Thr2, the beamforming weight is calculated for the RBG by using PEBF.

(C). Channel correlation or weight correlation between the users in the sub resource block groups is less than a third threshold. The channel correlation and the weight correlation may be represented by using a correlation metric, or may be represented by using a normalized mean square error (NMSE). This is not limited herein.

In embodiments of this application, the channel correlation or the weight correlation between the users in the sub resource block group is referred to as $\Delta Corr_{average}$, and the third threshold is referred to as Thr3.

When $\Delta Corr_{average}$ is less than the third threshold, the sub resource block group (the $j^{th}$ RBG) meets the first preset condition, and step 305 is performed. When $\Delta Corr_{average}$ is greater than or equal to the third threshold, the first preset condition is not met, and step 306 is performed. That is, when $\Delta Corr_{average}$<Thr3, the beamforming weight is calculated for the RBG by using NEBF; when $\Delta Corr_{average}$ ?Thr3, the beamforming weight is calculated for the RBG by using PEBF.

It may be understood that, it is considered that the first preset condition is met if any one or more of the first preset conditions (A, B, or C) are met.

305: If the sub resource block group meets the first preset condition, determine that NEBF is used for the sub resource block group.

In step 305, when the sub resource block group meets the first preset condition, it is determined that the beamforming weight of the sub resource block group is calculated for the sub resource block group by using NEBF. Step 307 is performed to calculate the beamforming weight of the sub resource block group by using NEBF.

306: If the sub resource block group does not meet the first preset condition, determine that PEBF is used for the sub resource block group.

In step 306, when the sub resource block group does not meet the first preset condition, it is determined that the beamforming weight of the sub resource block group is calculated for the sub resource block group by using PEBF. Step 307 is performed to obtain the beamforming weight of the sub resource block group by using PEBF. In embodiments of this application, the obtaining, by using PEBF, the beamforming weight corresponding to the sub resource block group is also referred to as calculating, by using PEBF, the beamforming weight corresponding to the sub resource block group.

307: Obtain, based on a beamforming weight calculation method corresponding to each sub resource block group, a beamforming weight corresponding to the sub resource block group.

The following separately describes how to calculate, by using NEBF and PEBF, a beamforming weight corresponding to a sub resource block group. The following uses a single-sector scenario as an example to describe calculation methods in some embodiments:

(AA). NEBF:

First, the network device determines an NEBF set. The NEBF set includes one or more sub resource block groups, and a beamforming weight is calculated for the sub resource block group in the NEBF set by using NEBF. In other words, all sub resource block groups that are in the network device and for which a beamforming weight is calculated by using NEBF are referred to as an NEBF set. In embodiments of this application, the NEBF set is also referred to as an NEBF RBG.

For example, the sub resource block groups determined by the network device include a first sub resource block group, a second sub resource block group, a third sub resource block group, and a fourth sub resource block group. According to the foregoing method, sub resource block groups (that is, the NEBF set) for which the network device determines that a beamforming weight is calculated by using NEBF include the first sub resource block group and the second sub resource block group.

Then, the network device calculates average transmit power of the NEBF set by using NEBF, that is, calculates average transmit power of RBGs in the NEBF RBG by using NEBF. For example, average transmit power of the first sub resource block group and the second sub resource block group is calculated by using NEBF. The following method may be used for calculation:

$$E_{NEBF,aver}=\sum_{j=1}^{N_{NEBF}}\sum_{l=1}^{L_{layer,j}}(p_{j,l}*PA_{j,l}).$$

$E_{NEBF,aver}$ is the average transmit power of the NEBF set, $N_{NEBF}$ is a number of RBGs included in the NEBF RBG, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, $p_{j,l}$ is a power proportionality coefficient of an $l^{th}$ stream weight in the $j^{th}$ RBG in a current TTI, and the power proportionality coefficient is a percentage of power of an $l^{th}$ layer in total power of all layers.

Next, weight power of the NEBF set on an $n^{th}$ antenna is calculated by using NEBF, where n is an integer greater than or equal to 0. The following method may be used for calculation:

$$E_{NEBF}^{n}=M*\sum_{j=1}^{N_{NEBF}}\sum_{l=1}^{L_{layer,j}}(\|W_{j,l}^{MU}(n)\|^{2}*PA_{j,l}).$$

$$E_{NEBF}^{n}$$

is the weight power of the NEBF set on the $n^{th}$ antenna, M is a number of physical antennas in the network device, n=0 to M−1, $N_{NEBF}$ is the number of RBGs included in the NEBF RBG, $L_{layer,j}$ is the number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, and $$\|W_{j,l}^{MU}(n)\|^{2}$$

is a power value of an $n^{th}$ antenna at the $l^{th}$ layer in the $j^{th}$ RBG.

Next, the network device determines average transmit power of the NEBF set on the $n^{th}$ antenna based on the average transmit power $E_{NEBF,aver}$ of the NEBF set and the weight power $$E_{NEBF}^{n}$$

of the NEBF set on the $n^{th}$ antenna. The following method may be used for calculation:

$$P_{NEBF}^{n}=\frac{E_{NEBF}^{n}}{E_{NEBF,aver}}.$$

$$P_{NEBF}^{n}$$

is the average transmit power of the NEBF set on the $n^{th}$ antenna, $E_{NEBF,aver}$ is the average transmit power of the NEBF set, and $$E_{NEBF}^{n}$$

is the weight power of the NEBF set on the $n^{th}$ antenna.

Finally, normalization processing is performed on a weight on the $n^{th}$ antenna based on the average transmit power $$P_{NEBF}^{n}$$

of the NEBF set on the $n^{th}$ antenna, to obtain a beamforming weight. The following method may be used for calculation:

$$W_{j,l}^{MU}(n)=\frac{W_{j,l}^{MU}}{\sqrt{P_{NEBF}^{n}}}\tau_{NEBF}.$$

$$W_{j,l}^{MU}(n)$$

is the beamforming weight of the $n^{th}$ antenna at the $l^{th}$ layer in the $j^{th}$ RBG, $$W_{j,l}^{MU}$$

is the weight of the $l^{th}$ layer in the $j^{th}$ RBG, $$P_{NEBF}^{n}$$

is the average transmit power of the NEBF set on the n antenna, and $\tau_{NEBF}$ is the NEBF-based weight power adjustment factor. $\tau_{NEBF}$ may be calculated based on full-power bandwidth (FPBW) power, or $\tau_{NEBF}$ may be calculated based on $\tau_{PEBF}$, for example, $$\tau_{NEBF}=\frac{1}{\tau_{PEBF}},$$

that is, $\tau_{NEBF}$ may be greater than 1.

(BB). PEBF:

First, the network device determines a PEBF set. The PEBF set includes one or more sub resource block groups, and a beamforming weight is calculated for the sub resource block group in the PEBF set by using PEBF. In other words, all sub resource block groups that are in the network device and for which a beamforming weight is calculated by using PEBF are referred to as a PEBF set. In embodiments of this application, the PEBF set is also referred to as a PEBF RBG.

For example, the sub resource block groups determined by the network device include a first sub resource block group, a second sub resource block group, a third sub resource block group, and a fourth sub resource block group.

According to the foregoing method, sub resource block groups (that is, the PEBF set) for which the network device determines that a beamforming weight is calculated by using PEBF include the first sub resource block group and the second sub resource block group.

Then, the network device calculates average transmit power of the PEBF set by using PEBF, that is, calculates average transmit power of RBGs in the PEBF RBG by using PEBF. For example, average transmit power of the first sub resource block group and the second sub resource block group is calculated by using PEBF. The following method may be used for calculation:

$$E_{PEBF,aver} = \sum_{j=1}^{N_{PEBF}} \sum_{l=1}^{L_{layer,j}} (p_{j,l} * PA_{j,l}).$$

$E_{PEBF,aver}$ is the average transmit power of the PEBF set, $N_{PEBF}$ is a number of RBGs included in the PEBF RBG, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, $p_{j,l}$ is a power proportionality coefficient of an $l^{th}$ stream weight in the $j^{th}$ RBG in a current TTI, and the power proportionality coefficient is a percentage of power of an $l^{th}$ layer in total power of all layers.

Next, weight power of the PEBF set on an $n^{th}$ antenna is calculated by using PEBF, where n is an integer greater than or equal to 0. The following method may be used for calculation:

$$E_{PEBF}^{n} = M * \sum_{j=1}^{N_{PEBF}} \sum_{l=1}^{L_{layer,j}} \left(\left\|W_{j,l}^{MU}(n)\right\|^2 * PA_{j,l}\right).$$

$$\tau_{NEBF} = \frac{1}{\tau_{NEBF}},$$

is the weight power of the PEBF set on the $n^{th}$ antenna, M is a number of physical antennas in the network device, n=, $N_{NEBF}$ is the number of RBGs included in the PEBF RBG, $L_{layer,j}$ is the number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a PA interface, and $$\left\|W_{j,l}^{MU}(n)\right\|^2$$

is a power value of an $n^{th}$ antenna at the $l^{th}$ layer in the $j^{th}$ RBG.

Next, the network device determines average transmit power of the PEBF set on the $n^{th}$ antenna based on the average transmit power $E_{PEBF,aver}$ of the PEBF set and the weight power $$E_{PEBF}^{n}$$

of the PEBF set on the $n^{th}$ antenna. The following method may be used for calculation:

$$P_{PEBF}^{n} = \frac{E_{PEBF}^{n}}{E_{PEBF,aver}}.$$

$$P_{PEBF}^{n}$$

is the average transmit power of the PEBF set on the $n^{th}$ antenna, $E_{PEBF,aver}$ is the average transmit power of the PEBF set, and $$E_{PEBF}^{n}$$

is the weight power of the PEBF set on the $n^{th}$ antenna.

Finally, normalization processing is performed on a weight on the $n^{th}$ antenna based on the average transmit power $$P_{PEBF}^{n}$$

of the PEBF set on the $n^{th}$ antenna, to obtain a beamforming weight. The following method may be used for calculation:

$$W_{j,l}^{MU}(n) = \frac{W_{j,l}^{MU}}{\sqrt{\max(P_{PEBF}^{n})}} \tau_{PEBF}.$$

$$W_{j,l}^{MU}(n)$$

is the beamforming weight of the $n^{th}$ antenna at the $l^{th}$ layer in the $j^{th}$ RBG, $$W_{j,l}^{MU}$$

is the weight of the $l^{th}$ layer in the $j^{th}$ RBG, $$\max(P_{PEBF}^{n})$$

is a maximum value of the average transmit power of the PEBF set on the $n^{th}$ antenna, and $\tau_{PEBF}$ is the PEBF-based weight power adjustment factor;

$$\tau_{PEBF} = \frac{1}{\max(E_0, E_1, \ldots, E_{M-1})};$$

-continued $$\text{and } E_n = \sqrt{\frac{M}{\frac{\sum_{j=1}^{N_{BfRbgNum}} \sum_{l=1}^{L_{layer,j}} (p_{j,l} * PA_{j,l})}{\sum_{j=1}^{N_{BfRbgNum}} \sum_{l=1}^{L_{layer,j}} (\|W_{j,l}^{MU}(n)\|^2 * PA_{j,l})}}}.$$

n is an integer greater than or equal to 0, n=0,1, . . . , M−1, $N_{BfRbgNum}$ is a number of RBGs that are in the network device and for which a weight is calculated by using PEBF, M is a number of physical antennas in the network device, $L_{layer,j}$ is a number of paired layers in the $j^{th}$ RBG, the number of paired layers is a total number of data streams sent by a plurality of users in one RBG, $PA_{j,l}$ is a power factor configured for a user in the $j^{th}$ RBG, a value of $PA_{j,l}$ is a linear value found in a TDD interface and index table based on an index value of a power allocation interface, $p_{j,l}$ is a power proportionality coefficient of an $l^{th}$ stream weight in the $j^{th}$ RBG in a current TTI, the power proportionality coefficient is a percentage of power of the $l^{th}$ layer in total power of all layers, and $$\|W_{j,l}^{MU}(n)\|^2$$

is the power value of the $n^{th}$ antenna at the $l^{th}$ layer in the $j^{th}$ RBG.

It should be noted that, when the users scheduled in the sub resource group include a user sensitive to a weight direction change, a beamforming weight of the user sensitive to the weight direction change in the sub resource block group is not calculated. The user sensitive to the weight direction change still uses an original weight to weight data. The user sensitive to the weight direction change may be understood as a user whose user performance is significantly degraded when a weight direction changes. For example, when the users scheduled in the sub resource group include a transmission mode 4 (TM4) user, a beamforming weight of the TM4 user in the sub resource block group is not calculated. The TM4 user still uses an original weight to weight data.

It may be understood that for another scenario, for example, a cell split sector scenario, a manner of obtaining a beamforming weight of a sub resource block group is similar to that in the foregoing single-sector scenario, and details are not described herein again.

308: Weight data based on the beamforming weight.

309: Send weighted data.

In some embodiments of this application, for each sub resource block group, a corresponding beamforming weight calculation method is adaptively determined, and a corresponding beamforming weight is obtained based on the determined beamforming calculation method, to implement optimal performance. This effectively improves a power utilization ratio of downlink data sending in the network device, effectively improves spectral efficiency of a cell, and improves an average throughput of the cell. In a possible simulation experiment result, compared with PEBF, the beamforming weight calculation method (referred to as AEBF) provided in embodiments of this application has a larger gain in both an average power utilization ratio and an average cell throughput. For example, compared with PEBF, AEBF has a gain of 6% in the average power utilization ratio; and compared with PEBF, APBF has a gain of 5% in the average cell throughput.

Figure 4:
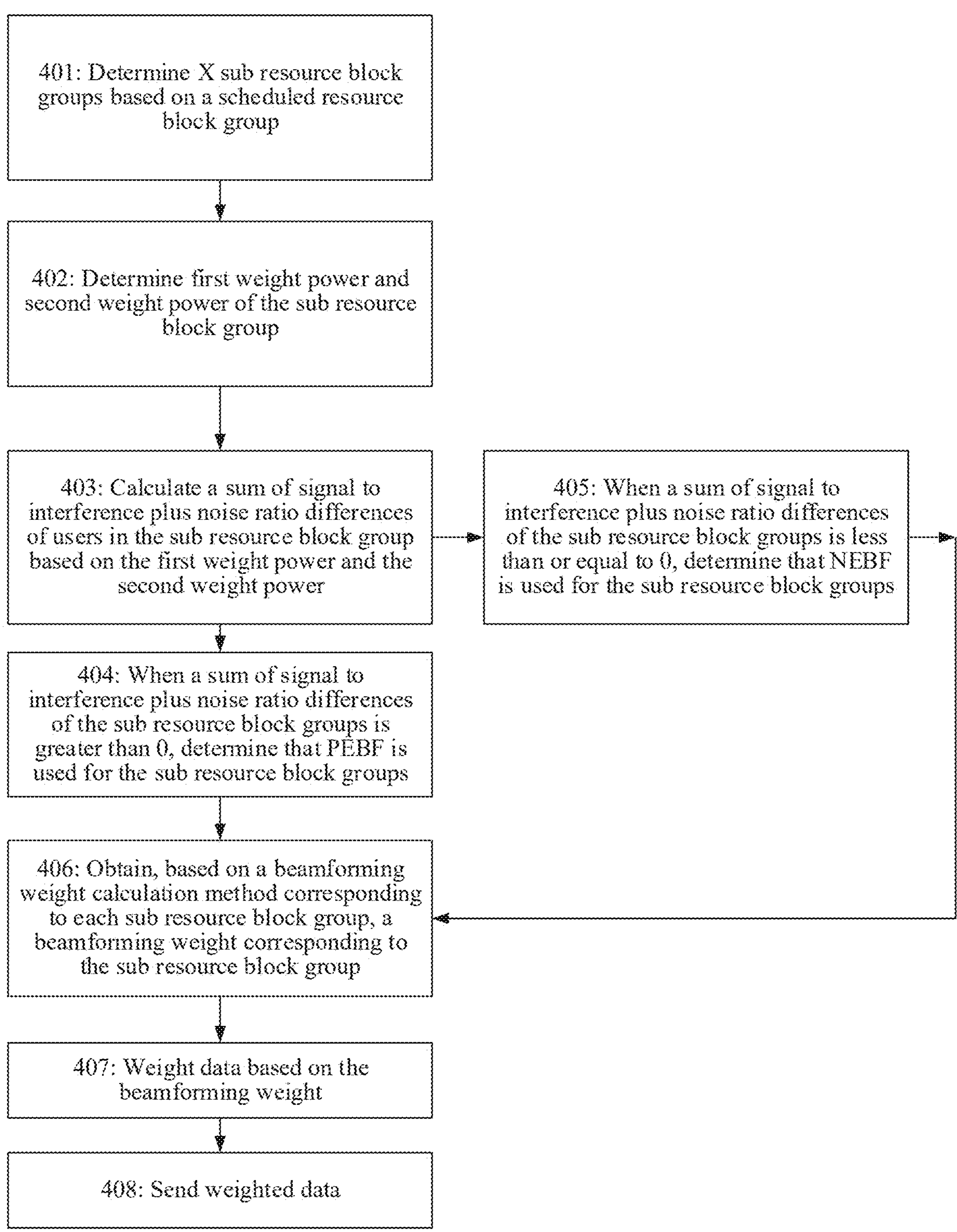
FIG. 4 is a diagram of an embodiment of a beamforming weight calculation method according to embodiments of this application.

The following describes, based on the foregoing embodiment, another beamforming weight calculation method provided in embodiments of this application. Determining, based on a difference between a signal to interference plus noise ratio of weight power calculated for each sub resource block group by using PEBF and a signal to interference plus noise ratio of weight power calculated for the sub resource block group by using NEBF, a beamforming weight calculation method corresponding to all the sub resource block groups is described. FIG. 4 is a diagram of an embodiment of a beamforming weight calculation method according to embodiments of this application. The beamforming weight calculation method according to some embodiments of this application includes the following steps.

401: Determine X sub resource block groups based on a scheduled resource block group.

Step 401 is consistent with step 301, and details are not described herein again.

402: Determine first weight power and second weight power of the sub resource block group.

In step 402, the network device determines first weight power and second weight power of the sub resource block group. The first weight power is weight power calculated by the network device for the sub resource block group by using PEBF, and the second weight power is weight power calculated by the network device for the sub resource block group by using NEBF. For an example calculation method, refer to the foregoing embodiment. Details are not described herein again.

403: Calculate a sum of signal to interference plus noise ratio differences of users in the sub resource block group based on the first weight power and the second weight power.

In step 403, after the first weight power and the second weight power of the sub resource block group are determined, power of each row of antennas is calculated based on the first weight power and the second weight power. The following method may be used to calculate the power of each row of antennas:

$P=P_n=[P_0\ P_1\ .\ .\ .\ P_{M-1}]$, where $P_n$ is power of an $n^{th}$ antenna, n=0,1, . . . , M−1, M is an integer greater than 1, and M is a number of antenna ports of the network device.

Optionally, enhanced zero-forcing (EZF) processing may be performed on the first weight power and the second weight power, and then the power of each row of antennas may be calculated based on the first weight power on which the enhanced zero-forcing processing is performed and the second weight power on which the enhanced zero-forcing processing is performed.

Then, a power utilization ratio is calculated based on a sum of power of all antennas in the power of each row of antennas and maximum power in the power of each row of antennas. The following method may be used to calculate the power utilization ratio:

$$\gamma_{PEBF} = \frac{\sum_{n=0}^{M-1} P_n}{M * \max(P_n)}.$$

$\gamma_{PEBF}$ is the power utilization ratio, $\max(P_n)$ is the maximum power of the antennas in each row of antennas, and $$\sum_{n=0}^{M-1} P_n$$

is the sum of the power of all the antennas in the power of each row of antennas.

Next, power correlation of the power of each row of antennas is calculated based on the power of each row of antennas and a full-power multi-user weight vector. The following method may be used to calculate the power correlation of the power of each row of antennas:

$$\rho_{P,NEBF} = \frac{\|P \cdot P_{REF}\|}{\sqrt{\|P \cdot P\|^2 \cdot \|P_{REF} \cdot P_{REF}\|^2}}$$

$P_{REF}=[1, 1, 1]_{M\times 1}$, $P_{REF}$ is the full-power multi-user weight vector, and $\rho_{P,NEBF}$ is the power correlation.

Next, a signal to interference plus noise ratio difference of an $l^{th}$ user in the sub resource block group is calculated based on the power utilization ratio and the power correlation, where 1 is a positive integer. The following method may be used to calculate the signal to interference plus noise ratio difference of the $l^{th}$ user in the sub resource block group:

$$SINR_{l,Delta} = 10 \cdot \log_{10}\gamma_{PEBF} \frac{\beta_{interf,nebf} \cdot \sum_{k=0,k\neq l}^{L-1} (1-\rho_{P,NEBF}) \cdot 10^{CQI_k/10} * p_k + 1}{\rho_{P,NEBF}}$$

$\beta_{interf,nebf}$ is an interference adjustment parameter, $$\beta_{interf,nebf} = \frac{0.2}{M} \cdot e^{4 \cdot \gamma_{PEBF}} \cdot \left(1 + \frac{\gamma_{PEBF}}{0.4}\right), \rho_{P,NEBF}$$

is weight correlation between the first weight power and the second weight power, $P_k$ represents power allocated to a $k^{th}$ stream, $RB_{Num}$ is a number of sub resource block groups, $RB_{Num}$=X, $CQI_k$ is channel quality indicator (CQI) information of the $k^{th}$ stream, $SINR_{l,Delta}$ is the signal to interference plus noise ratio difference of the $l^{th}$ user in the sub resource block group, and the signal to interference plus noise ratio difference is a difference between a signal to interference plus noise ratio calculated based on first weight power of the user and a signal to interference plus noise ratio calculated based on second weight power of the user.

Finally, a sum of signal to interference plus noise ratio differences of the X sub resource block groups is determined based on a sum of signal to interference plus noise ratio differences of users in the sub resource block group. The following method may be used to calculate the sum of the signal to interference plus noise ratio differences of the X sub resource block groups:

$$SINR_{Delta} = \sum_{n=0}^{RB_{Num}} \sum_{l=0}^{L-1} SINR_{l,Delta};$$

$$\sum_{l=0}^{L-1} SINR_{l,Delta}$$

is the sum of the signal to interference plus noise ratio differences of the users in the sub resource block group, and $SINR_{Delta}$ is the sum of the signal to interference plus noise ratio differences of the X sub resource block groups.

After calculating the sum of the signal to interference plus noise ratio differences of the X sub resource block groups, the network device determines, based on the sum of the signal to interference plus noise ratio differences of the X sub resource block groups, a beamforming calculation method used for the X sub resource block groups.

In a possible implementation, as shown in steps 404 and 405, the beamforming calculation method used for the X sub resource block groups is determined based on a relationship between the sum of the signal to interference plus noise ratio differences of the X sub resource block groups and a threshold 0.

It may be understood that the threshold may be another value other than 0. This is not limited herein.

404: When the sum of the signal to interference plus noise ratio differences of the X sub resource block groups is greater than 0, determine that PEBF is used for the X sub resource block groups.

405: When the sum of the signal to interference plus noise ratio differences of the X sub resource block groups is less than or equal to 0, determine that NEBF is used for the X sub resource block groups.

After step 404 or 405, step 406 is performed.

406: Obtain, based on a beamforming weight calculation method corresponding to each sub resource block group, a beamforming weight corresponding to the sub resource block group.

Step 406 is similar to step 307, and details are not described herein again.

407: Weight data based on the beamforming weight.

408: Send weighted data.

In some embodiments of this application, for a plurality of sub resource block groups, a corresponding beamforming weight calculation method is adaptively determined by calculating channel capacities of PEBF and NEBF, and a corresponding beamforming weight is obtained based on the determined beamforming calculation method, to implement optimal performance. This effectively improves a power utilization ratio of downlink data sending in the network device, effectively improves spectral efficiency of a cell, and improves an average throughput of the cell. Because the beamforming weight calculation method shown in FIG. 4 is determining, based on SINRs, whether PEBF or NEBF is used, for some sub resource block groups in a high-order modulation scenario, a beamforming weight may also be calculated by using NEBF, thereby effectively improving antenna power. In a possible simulation experiment result, compared with PEBF, the beamforming weight calculation method (namely, AEBF) provided in embodiments of this application has a larger gain in both an average power utilization ratio and an average cell throughput. For example, compared with PEBF, AEBF has a gain of 10% in the average power utilization ratio; and compared with PEBF, APBF has a gain of 7.6% in the average cell throughput.

Based on the foregoing embodiment, power sharing may be implemented between different sub resource block groups, so that a sum of power of the plurality of sub resource block groups in a same antenna reaches maximum power of the antenna. The following provides a description with reference to an accompanying drawing. FIG. 5 is a diagram of power in a beamforming weight calculation method according to an embodiment of this application. An example in which the X sub resource block groups determined by the network device based on the scheduled resource block group include a first sub resource block group and a second sub resource block group is used for description. It may be understood that the method shown in FIG. 5 may also apply to a scenario with more sub resource block groups. Details are not described herein again.

First, the network device calculates normalized power of the first sub resource block group by using PEBF. The power is referred to as initial power of the first sub resource block group. The network device calculates normalized power of the second sub resource block group by using NEBF. The power is referred to as initial power of the second sub resource block group.

Then, the network device determines maximum power of each antenna. FIG. 5 is used as an example for description. In this case, maximum power of a same antenna is 2.

Next, to improve a power utilization ratio of the network device, using an example in which the same antenna is used to receive and transmit only data of the first sub resource block group and data of the second sub resource block group, a sum of power of the first sub resource block group and power of the second sub resource block group needs to be equal to the maximum power of the same antenna.

With reference to FIG. 5, the network device includes an antenna 1 to an antenna 6. Maximum power of each antenna is 2, and power corresponding to each sub resource block group in each antenna is equal (maximum power of each sub resource block group in each antenna is 1). Power utilization ratios of the first sub resource block group in the antenna 1 to the antenna 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1.

In this case, initial power, calculated by using PEBF, of the first sub resource block group in the antenna 1 to the antenna 6 is 1, 1, 1, $\alpha_0$, $\alpha_1$, and $\alpha_2$, respectively. Remaining power of the first sub resource block group in the antenna 1 to the antenna 6 is 0, 0, 0, $1-\alpha_0$, $1-\alpha_1$, and $1-\alpha_2$, respectively.

Initial power, calculated by using NEBF, of the second sub resource block group in the antenna 1 to the antenna 6 are 1, 1, 1, 1, 1, and 1, respectively.

To further improve the power utilization ratio of the network device, the remaining power may be shared to the second sub resource block group for use, so that a sum of power of the first sub resource block group and power of the second sub resource block group in a same antenna is equal to maximum power of the same antenna. In this case, power of the second sub resource block group in the antenna 1 to the antenna 6 are 1, 1, 1, $2-\alpha_0$, $2-\alpha_1$, and $2-\alpha_2$, respectively.

In some embodiments of this application, power sharing may be implemented between a plurality of sub resource block groups in a same antenna in the network device, so that a sum of power of the plurality of sub resource block groups in the same antenna reaches maximum power of the antenna, thereby improving a power utilization ratio of the antenna in the network device, and implementing optimal performance. This effectively improves a power utilization ratio of downlink data sending in the network device, effectively improves spectral efficiency of a cell, and improves an average throughput of the cell. Because the beamforming weight calculation method shown in FIG. 5 is determining, based on SINRs, whether PEBF or NEBF is used, for some sub resource block groups in a high-order modulation scenario, a beamforming weight may also be calculated by using NEBF, thereby effectively improving antenna power. In a possible simulation experiment result, compared with PEBF, the beamforming weight calculation method (namely, AEBF) provided in embodiments of this application has a larger gain in both an average power utilization ratio and an average cell throughput. For example, compared with PEBF, AEBF has a gain of 14.29% in the average power utilization ratio; and compared with PEBF, APBF has a gain of 8.56% in the average cell throughput.

Based on the foregoing embodiment, power sharing may be implemented in a same antenna between power of different users in a same sub resource block group, so that a sum of power of the plurality of users in the same sub resource block group reaches maximum power of the antenna. The following provides a description with reference to an accompanying drawing. FIG. 6 is a diagram of power in a beamforming weight calculation method according to an embodiment of this application. An example in which the sub resource block group includes a first user and a second user is used for description. The first user is a user sensitive to a weight direction change, for example, a TM4 user. The second user is a user insensitive to a weight direction change, for example, a TM9 user.

First, the network device calculates normalized power of the sub resource block group by using PEBF or NEBF, and then obtains power values of different users in the sub resource block group at different layers of a same antenna. With reference to a scenario shown in FIG. 6, for example, the network device includes a layer 1 to a layer 6 (the layer is a physical layer), maximum power of each layer is 2, and power corresponding to each user at each layer is equal (maximum power of each user at each layer is 1).

Power utilization ratios of the first user at the layer 1 to the layer 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1. In this case, initial power of the first user at the layer 1 to the layer 6 is 1, 1, 1, $\alpha_0$, $\alpha_1$, and $\alpha_2$, respectively. Remaining power of the first user at the layer 1 to the layer 6 is 0, 0, 0, $1-\alpha_0$, $1-\alpha_1$, and $1-\alpha_2$, respectively.

Because the first user is a user sensitive to a weight direction change, and the first user is characterized in that a channel estimation value based on a pilot needs to be consistent with a channel estimation value of data, power of the first user does not need to be adjusted. Remaining power of the first user at a same layer of each antenna may be shared to the second user at the same layer of the same antenna, so that a sum of power of the first user and power of the second user in the same antenna is equal to maximum power of the same antenna.

The remaining power of the first user at the layer 1 to the layer 6 may be respectively 0, 0, 0, $1-\alpha_0$, $1-\alpha_1$, and $1-\alpha_2$, and may be shared to the second user, so that a sum of power of the first user and power of the second user in a same antenna is equal to maximum power of the same antenna. In this case, power of the second user at the layer 1 to the layer 6 is 1, 1, 1, $2-\alpha_0$, $2-\alpha_1$, and $2-\alpha_2$, respectively.

In some embodiments of this application, power sharing may be implemented between a plurality of users at a same layer of a same antenna of the network device, so that a sum of power of a first user and power of a second user in the same antenna is equal to maximum power of the same antenna, thereby improving a power utilization ratio of the network device, and implementing optimal performance. This effectively improves a power utilization ratio of downlink data sending in the network device, effectively improves spectral efficiency of a cell, and improves an average throughput of the cell. Because power sharing can be implemented between users in a same sub resource block group, power efficiency of an antenna in the network device can be improved. In a possible simulation experiment result, compared with PEBF, the beamforming weight calculation method (namely, AEBF) provided in embodiments of this application has a larger gain in both an average power utilization ratio and an average cell throughput. For example, compared with PEBF, AEBF has a gain of 14.29% in the average power utilization ratio; and compared with PEBF, APBF has a gain of 9.10% in the average cell throughput.

Based on the foregoing embodiment, power of a user sensitive to a weight direction change in a same sub resource block group may be increased. The power increase means to increase an upper power limit of the user sensitive to the weight direction change. Power of each user is dynamically adjusted based on different modulation schemes of the user, to improve a power utilization ratio of the network device and improve a data throughput of the network device. The following provides a description with reference to an accompanying drawing. FIG. 7 is a diagram of power in a beamforming weight calculation method according to an embodiment of this application. An example in which the sub resource block group includes a first user and a second user is used for description. The first user is a user sensitive to a weight direction change, for example, a TM4 user. The second user is a user insensitive to a weight direction change, for example, a TM9 user.

First, the network device calculates normalized power of the sub resource block group by using PEBF or NEBF, and then obtains power values of different users in the sub resource block group at different layers of a same antenna. With reference to a scenario shown in FIG. 7, for example, the network device includes a layer 1 to a layer 6 (the layer is a physical layer), and maximum power of each layer is 2. Users at each layer are grouped, for example, users can be grouped into a first user group and a second user group. The first user group includes one or more first users, the second user group includes one or more first users and one or more second users, and the first user in the first user group is different from the first user in the second user group. Maximum power of the first user group and maximum power of the second user group at each layer are the same, and both are 1.

Power utilization ratios of the first user group at the layer 1 to the layer 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1. In this case, initial power of the first user group at the layer 1 to the layer 6 is 1, 1, 1, $\alpha_0$, $\alpha_1$, and $\alpha_2$, respectively. Remaining power of the first user group at the layer 1 to the layer 6 is 0, 0, 0, $1-\alpha_0$, $1-\alpha_1$, and $1-\alpha_2$, respectively.

Because the first user is a user sensitive to a weight direction change, and the first user is characterized in that a channel estimation value based on a pilot needs to be consistent with a channel estimation value of data, impact of different modulation schemes on the first user needs to be considered. An upper increase limit of power of the first user varies with different modulation schemes. The following describes a possible implementation with reference to Table 1.

TABLE 1

| Modulation scheme | Upper increase limit of power |
| --- | --- |
| Quadrature phase shift keying QPSK | One time a maximum power threshold |
| 16 quadrature amplitude modulation QAM | Two times a maximum power threshold |
| 64QAM or 256QAM | Cannot be increased |

It may be understood that, for different modulation schemes, the upper increase limit of the power of the first user may be implemented in other manners. For example, when the modulation scheme of the first user is quadrature phase shift keying QPSK, the upper increase limit of the power of the first user is 1.5 times a maximum power threshold. When the modulation scheme of the first user is 16 quadrature amplitude modulation QAM, the upper increase limit of the power of the first user is 1.8 times the maximum power threshold. This is not limited herein.

The maximum power threshold is a preset power threshold, and the maximum power threshold corresponds to a modulation scheme. When power exceeds the maximum power threshold, demodulation performance of a constellation point corresponding to the modulation scheme is easily degraded.

In a possible implementation, in a same sub resource block group, power of a first user (for example, a TM4 user) is increased, and an upper power limit of a second user (for example, a TM9 user) is decreased, to keep total power of users (or a sum of power of users) in the same sub resource block group unchanged.

In a possible implementation, an example in which first users in a same sub resource block group include a first user A, a first user B, and a first user C is used for description. Power of a part (for example, the first user A) of the first users is increased, and an upper power limit of another user in the first users is decreased (for example, an upper power limit of the first user B is decreased, or an upper power limit of the first user C is decreased, or upper power limits of the first user B and the first user C are both decreased), to keep total power of users (or a sum of power of users) in the same sub resource block group unchanged.

With reference to FIG. 7, the remaining power of the first user group at the layer 1 to the layer 6 is respectively 0, 0, 0, $1-\alpha_0$, $1-\alpha_1$, and $1-\alpha_2$, and may be shared to the first user in the second user group, to increase power of the first user in the second user group. In a same antenna, a sum of power of the first user after the increase and power of the second user is equal to a sum of the power of the first user before the increase and power of the second user, and is equal to maximum power of the same antenna. In this case, power of the second user group at the layer 1 to the layer 6 is 1, 1, 1, $2-\alpha_0$, $2-\alpha_1$, and $2-\alpha_2$, respectively.

In some embodiments of this application, power of a user sensitive to a weight direction change in a same sub resource block group may be increased. The power increase means to increase an upper power limit of the user sensitive to the weight direction change. Power of each user is dynamically adjusted based on different modulation schemes of the user, to improve a power utilization ratio of the network device and improve a data throughput of the network device. The power utilization ratio of the network device is improved, thereby implementing optimal performance. This effectively improves a power utilization ratio of downlink data sending in the network device, effectively improves spectral efficiency of a cell, and improves an average throughput of the cell. In a possible simulation experiment result, compared with PEBF, the beamforming weight calculation method (namely, AEBF) provided in embodiments of this application has a larger gain in both an average power utilization ratio and an average cell throughput. For example, compared with PEBF, AEBF has a gain of 14.29% in the average power utilization ratio; and compared with PEBF, APBF has a gain of 9.28% in the average cell throughput.

Figure 8:
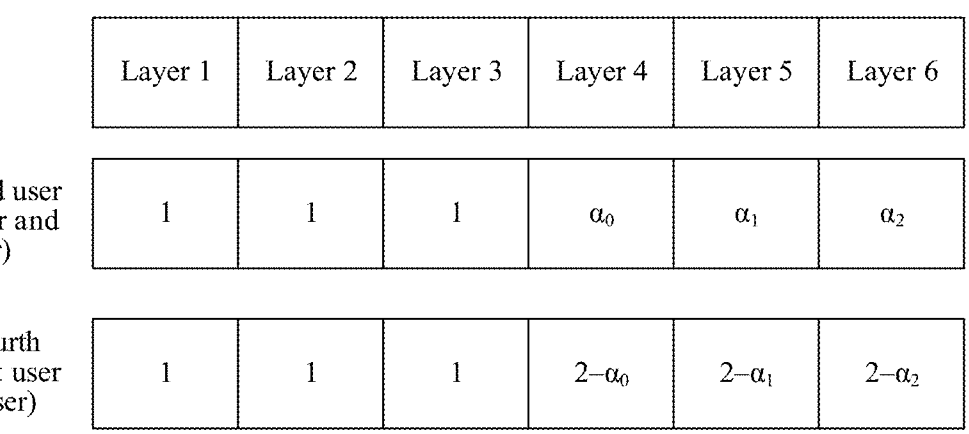
FIG. 8 is a diagram of power in a beamforming weight calculation method according to an embodiment of this application.

Based on the foregoing embodiment, in a same sub resource block group, power of a user sensitive to a weight direction change may be increased, and power of a user insensitive to a weight direction change may also be increased. The power increase means to increase an upper power limit of the user sensitive to the weight direction change. Power of each user is dynamically adjusted based on different modulation schemes of the user, to improve a power utilization ratio of the network device and improve a data throughput of the network device. The following provides a description with reference to an accompanying drawing. FIG. 8 is a diagram of power in a beamforming weight calculation method according to an embodiment of this application. An example in which the sub resource block group includes a first user and a second user is used for description. The first user is a user sensitive to a weight direction change, for example, a TM4 user. The second user is a user insensitive to a weight direction change, for example, a TM9 user.

First, the network device calculates normalized power of the sub resource block group by using PEBF or NEBF, and then obtains power values of different users in the sub resource block group at different layers of a same antenna. With reference to a scenario shown in FIG. 8, for example, the network device includes a layer 1 to a layer 6 (the layer is a physical layer), and maximum power of each layer is 2. Users at each layer are grouped, for example, users can be grouped into a third user group and a fourth user group. The third user group includes one or more first users and one or more second users, the fourth user group includes one or more first users and one or more second users, the first user in the third user group is different from the first user in the fourth user group, and the second user in the third user group is different from the second user in the fourth user group. Maximum power of the third user group and maximum power of the fourth user group at each layer are the same, and both are 1.

Power utilization ratios of the third user group at the layer 1 to the layer 6 are respectively 1, 1, 1, $\alpha_0$, $\alpha_1$, and $\alpha_2$, where $\alpha_0$, $\alpha_1$, and $\alpha_2$ are real numbers greater than 0 and less than or equal to 1. In this case, initial power of the third user group at the layer 1 to the layer 6 is 1, 1, 1, $\alpha_0$, $\alpha_1$, and $\alpha_2$, respectively. Remaining power of the third user group at the layer 1 to the layer 6 is 0, 0, 0, $1-\alpha_0$, $1-\alpha_1$, and $1-\alpha_2$, respectively.

Because the first user is a user sensitive to a weight direction change, and the first user is characterized in that a channel estimation value based on a pilot needs to be consistent with a channel estimation value of data, impact of different modulation schemes on the first user needs to be considered. An upper increase limit of power of the first user varies with different modulation schemes.

For the second user, impact of different modulation schemes on the second user also needs to be considered. An upper increase limit of power of the second user varies with different adjustment methods. The following describes a possible implementation with reference to Table 2.

TABLE 2

| Modulation scheme | Upper increase limit of power |
|---|---|
| Quadrature phase shift keying QPSK | One time a maximum power threshold |
| 16 quadrature amplitude modulation QAM | Two times a maximum power threshold |
| 64QAM or 256QAM | Cannot be increased |

It may be understood that, for different modulation schemes, the upper increase limit of the power of the second user may be implemented in other manners. For example, when the modulation scheme of the second user is quadrature phase shift keying QPSK, the upper increase limit of the power of the second user is 1.5 times a maximum power threshold. When the modulation scheme of the second user is 16 quadrature amplitude modulation QAM, the upper increase limit of the power of the second user is 1.8 times the maximum power threshold. This is not limited herein.

In a possible implementation, in a same sub resource block group, power of a second user (for example, a TM4 user) is increased, and an upper power limit of another first user (for example, a TM9 user) is decreased, to keep total power of users (or a sum of power of users) in the same sub resource block group unchanged.

In a possible implementation, an example in which second users in a same sub resource block group include a second user A, a second user B, and a second user C is used for description. Power of a part (for example, the second user A) of the second users is increased, and an upper power limit of another user in the second users is decreased (for example, an upper power limit of the second user B is decreased, or an upper power limit of the second user C is decreased, or upper power limits of the second user B and the second user C are both decreased), to keep total power of users (or a sum of power of users) in the same sub resource block group unchanged.

With reference to FIG. 8, the remaining power of the third user group at the layer 1 to the layer 6 is respectively 0, 0, 0, $1-\alpha_0$, $1-\alpha_1$, and $1-\alpha_2$, and may be shared to a first user and/or a second user in the fourth user group, so that power of the first user and/or the second user in the fourth user group is increased. In a same antenna, a sum of power of the first user and/or the second user after the increase and power of another user is equal to a sum of the power of the first user and/or the second user before the increase and power of the another user, and is equal to maximum power of the same antenna. In this case, power of the fourth user group at the layer 1 to the layer 6 is 1, 1, 1, $2-\alpha_0$, $2-\alpha_1$, and $2-\alpha_2$, respectively.

In some embodiments of this application, in a same sub resource block group, power of a user sensitive to a weight direction change may be increased, and power of a user insensitive to a weight direction change may also be increased. The power increase means to increase an upper power limit of the user sensitive to the weight direction change. Power of each user is dynamically adjusted based on different modulation schemes of the user, to improve a power utilization ratio of the network device and improve a data throughput of the network device. The power utilization ratio of the network device is improved, thereby implementing optimal performance. This effectively improves a power utilization ratio of downlink data sending in the network device, effectively improves spectral efficiency of a cell, and improves an average throughput of the cell. In a possible simulation experiment result, compared with PEBF, the beamforming weight calculation method (namely, AEBF) provided in embodiments of this application has a larger gain in both an average power utilization ratio and an average cell throughput. For example, compared with PEBF, AEBF has a gain of 14.29% in the average power utilization ratio; and compared with PEBF, APBF has a gain of 10.18% in the average cell throughput.

The foregoing mainly describes the solutions provided in embodiments of this application from a perspective of methods. It may be understood that, to implement the foregoing functions, a network apparatus includes a corresponding hardware structure and/or software module for performing the functions. A person of ordinary skill in the art should easily be aware that, in combination with example modules, algorithms, and steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the encoding device may be divided into functional modules based on the foregoing method examples. For example, functional modules corresponding to various functions are obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 9:
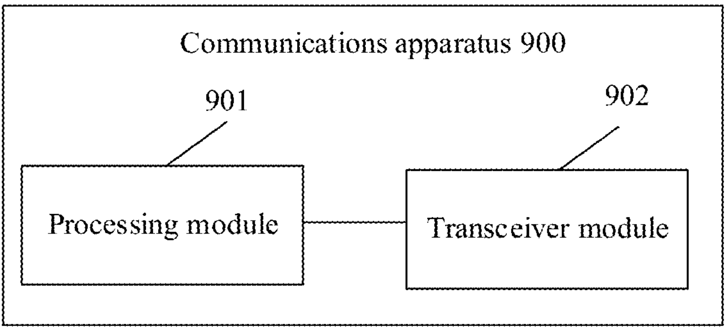
FIG. 9 is a diagram of an embodiment of a communications apparatus according to embodiments of this application.

The following describes in detail the communications apparatus in this application. FIG. 9 is a diagram of an embodiment of the communications apparatus according to embodiments of this application. The communications apparatus 900 includes:

a processing module 901, configured to determine X sub resource block groups based on a scheduled resource block group, where one of the X sub resource block groups includes a part of the resource block group, all resource block groups in each sub resource block group are occupied by a user, and X is a positive integer greater than 1, where the processing module 901 is further configured to determine, based on the X sub resource block groups, a beamforming weight calculation method used for each sub resource block group, where the beamforming weight calculation method includes normalized-eigen beamforming NEBF or power limited-eigen beamforming PEBF;

the processing module 901 is further configured to obtain, based on the beamforming weight calculation method corresponding to each sub resource block group, a beamforming weight corresponding to the sub resource block group; and the processing module 901 is further configured to weight data based on the beamforming weight; and a transceiver module 902, configured to send weighted data.

In a possible implementation, the processing module 901 is further configured to detect a number of users scheduled in the sub resource block group;

the processing module 901 is further configured to: when a single user is scheduled in the sub resource block group, determine that NEBF is used for the sub resource block group; and the processing module 901 is further configured to: when multiple users are scheduled in the sub resource block group, detect whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

In a possible implementation, the processing module 901 is further configured to: when the users scheduled in the sub resource block group include a user sensitive to a weight direction change, skip calculating the beamforming weight of the user sensitive to the weight direction change in the sub resource block group.

In a possible implementation, the processing module 901 is further configured to calculate average transmit power of an NEBF set by using NEBF, where the NEBF set includes one or more sub resource block groups, and the beamforming weight is calculated for the sub resource block group in the NEBF set by using NEBF;

the processing module 901 is further configured to calculate weight power of the NEBF set on an $n^{th}$ antenna by using NEBF, where n is an integer greater than or equal to 0;

the processing module 901 is further configured to determine average transmit power of the NEBF set on the $n^{th}$ antenna based on the average transmit power of the NEBF set and the weight power of the NEBF set on the $n^{th}$ antenna; and the processing module 901 is further configured to perform, based on the average transmit power of the NEBF set on the $n^{th}$ antenna, normalization processing on a weight corresponding to the sub resource block group in the NEBF set, to obtain the beamforming weight corresponding to the sub resource block group.

In a possible implementation, the processing module 901 is further configured to calculate average transmit power of a PEBF set by using PEBF, where the PEBF set includes one or more sub resource block groups, and the beamforming weight is calculated for the sub resource block group in the PEBF set by using PEBF;

the processing module 901 is further configured to calculate weight power of the PEBF set on an $n^{th}$ antenna by using PEBF, where n is an integer greater than or equal to 0;

the processing module 901 is further configured to determine average transmit power of the PEBF set on the $n^{th}$ antenna based on the average transmit power of the PEBF set and the weight power of the PEBF set on the $n^{th}$ antenna; and the processing module 901 is further configured to perform, based on the average transmit power of the PEBF set on the $n^{th}$ antenna, normalization processing on a weight corresponding to the sub resource block group in the PEBF set, to obtain the beamforming weight corresponding to the sub resource block group.

In a possible implementation, the processing module 901 is further configured to determine first weight power of the sub resource block group, where the first weight power is weight power calculated for the sub resource block group by using PEBF;

the processing module 901 is further configured to determine second weight power of the sub resource block group, where the second weight power is weight power calculated for the sub resource block group by using NEBF;

the processing module 901 is further configured to calculate a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

the processing module 901 is further configured to determine, based on the sum of the signal to interference plus noise ratio differences of the users in the sub resource block group, a sum of signal to interference plus noise ratio differences of the X sub resource block groups;

the processing module 901 is further configured to: when the sum of the signal to interference plus noise ratio differences of the X sub resource block groups is greater than 0, determine that a beamforming weight calculation method used for the X sub resource block groups is PEBF; and the processing module 901 is further configured to: when the sum of the signal to interference plus noise ratio differences of the X sub resource block groups is less than or equal to 0, determine that the beamforming weight calculation method used for the X sub resource block groups is NEBF.

In a possible implementation, the processing module 901 is further configured to perform enhanced zero-forcing processing on the first weight power and the second weight power of the sub resource block group, and calculate power of each row of antennas based on the first weight power on which the enhanced zero-forcing processing is performed and the second weight power on which the enhanced zero-forcing processing is performed;

the processing module 901 is further configured to calculate a power utilization ratio based on a sum of power of all antennas in the power of each row of antennas and maximum power in the power of each row of antennas;

the processing module 901 is further configured to calculate power correlation of the power of each row of antennas based on the power of each row of antennas and a full-power multi-user weight vector;

the processing module 901 is further configured to calculate a signal to interference plus noise ratio difference of an $l^{th}$ user in the sub resource block group based on the power correlation and the power utilization ratio, where 1 is a positive integer; and the processing module 901 is further configured to calculate the sum of the signal to interference plus noise ratio differences of the users in the sub resource block group.

In a possible implementation, the processing module 901 is further configured to calculate initial power of a first sub resource block group by using PEBF;

the processing module 901 is further configured to calculate initial power of a second sub resource block group by using NEBF; and the processing module 901 is further configured to determine power of the first sub resource block group and power of the second sub resource block group based on the initial power of the first sub resource block group and the initial power of the second sub resource block group, where a sum of power of the first sub resource block group and power of the second sub resource block group in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and the processing module 901 is further configured to increase power of the first user based on a modulation scheme of the first user, where a sum of power of the first user after the increase and power of the second user is the same as a sum of the power of the first user before the increase and power of the second user.

In a possible implementation, when the modulation scheme of the first user is quadrature phase shift keying QPSK, an upper increase limit of the power of the first user is one time a maximum power threshold;

when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

Figure 10:
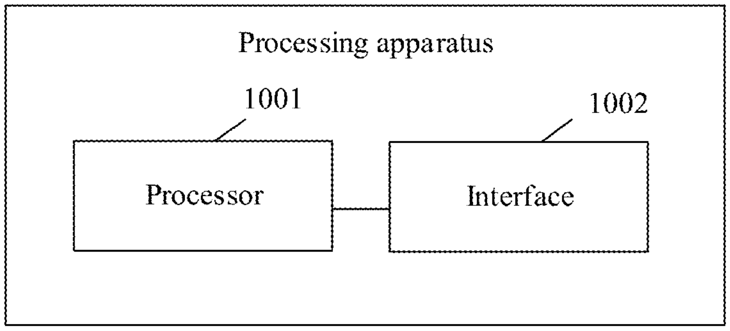
FIG. 10 is a diagram of a processing apparatus according to an embodiment of this application.

An embodiment of this application further provides a processing apparatus. FIG. 10 is a diagram of a processing apparatus according to an embodiment of this application. The processing apparatus includes a processor 1001 and an interface 1002. The processor 1001 is configured to perform the beamforming weight calculation method in any one of the foregoing method embodiments.

The processor 1001 is configured to determine X sub resource block groups based on a scheduled resource block group. One of the X sub resource block groups includes a part of the resource block group, all resource block groups in each sub resource block group are occupied by a user, and X is a positive integer greater than 1.

The processor 1001 is further configured to determine, based on the X sub resource block groups, a beamforming weight calculation method used for each sub resource block group, where the beamforming weight calculation method includes normalized-eigen beamforming NEBF or power limited-eigen beamforming PEBF.

The processor 1001 is further configured to obtain, based on the beamforming weight calculation method corresponding to each sub resource block group, a beamforming weight corresponding to the sub resource block group.

The processor 1001 is further configured to weight data based on the beamforming weight.

The interface 1002 is configured to send weighted data.

In a possible implementation, the processor 1001 is further configured to detect a number of users scheduled in the sub resource block group;

the processor 1001 is further configured to: when a single user is scheduled in the sub resource block group, determine that NEBF is used for the sub resource block group; and the processor 1001 is further configured to: when multiple users are scheduled in the sub resource block group, detect whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

In a possible implementation, the processor 1001 is further configured to: when the users scheduled in the sub resource block group include a user sensitive to a weight direction change, skip calculating the beamforming weight of the user sensitive to the weight direction change in the sub resource block group.

In a possible implementation, the processor 1001 is further configured to calculate average transmit power of an NEBF set by using NEBF, where the NEBF set includes one or more sub resource block groups, and the beamforming weight is calculated for the sub resource block group in the NEBF set by using NEBF;

the processor 1001 is further configured to calculate weight power of the NEBF set on an $n^{th}$ antenna by using NEBF, where n is an integer greater than or equal to 0;

the processor 1001 is further configured to determine average transmit power of the NEBF set on the $n^{th}$ antenna based on the average transmit power of the NEBF set and the weight power of the NEBF set on the $n^{th}$ antenna; and the processor 1001 is further configured to perform, based on the average transmit power of the NEBF set on the $n^{th}$ antenna, normalization processing on a weight corresponding to the sub resource block group in the NEBF set, to obtain the beamforming weight corresponding to the sub resource block group.

In a possible implementation, the processor 1001 is further configured to calculate average transmit power of a PEBF set by using PEBF, where the PEBF set includes one or more sub resource block groups, and the beamforming weight is calculated for the sub resource block group in the PEBF set by using PEBF;

the processor 1001 is further configured to calculate weight power of the PEBF set on an $n^{th}$ antenna by using PEBF, where n is an integer greater than or equal to 0;

the processor 1001 is further configured to determine average transmit power of the PEBF set on the $n^{th}$ antenna based on the average transmit power of the PEBF set and the weight power of the PEBF set on the $n^{th}$ antenna; and the processor 1001 is further configured to perform, based on the average transmit power of the PEBF set on the $n^{th}$ antenna, normalization processing on a weight corresponding to the sub resource block group in the PEBF set, to obtain the beamforming weight corresponding to the sub resource block group.

In a possible implementation, the processor 1001 is further configured to determine first weight power of the sub resource block group, where the first weight power is weight power calculated for the sub resource block group by using PEBF;

the processor 1001 is further configured to determine second weight power of the sub resource block group, where the second weight power is weight power calculated for the sub resource block group by using NEBF;

the processor 1001 is further configured to calculate a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

the processor 1001 is further configured to determine, based on the sum of the signal to interference plus noise ratio differences of the users in the sub resource block group, a sum of signal to interference plus noise ratio differences of the X sub resource block groups;

the processor 1001 is further configured to: when the sum of the signal to interference plus noise ratio differences of the X sub resource block groups is greater than 0, determine that a beamforming weight calculation method used for the X sub resource block groups is PEBF; and the processor 1001 is further configured to: when the sum of the signal to interference plus noise ratio differences of the X sub resource block groups is less than or equal to 0, determine that the beamforming weight calculation method used for the X sub resource block groups is NEBF.

In a possible implementation, the processor 1001 is further configured to perform enhanced zero-forcing processing on the first weight power and the second weight power of the sub resource block group, and calculate power of each row of antennas based on the first weight power on which the enhanced zero-forcing processing is performed and the second weight power on which the enhanced zero-forcing processing is performed;

the processor 1001 is further configured to calculate a power utilization ratio based on a sum of power of all antennas in the power of each row of antennas and maximum power in the power of each row of antennas;

the processor 1001 is further configured to calculate power correlation of the power of each row of antennas based on the power of each row of antennas and a full-power multi-user weight vector;

the processor 1001 is further configured to calculate a signal to interference plus noise ratio difference of an $1^{th}$ user in the sub resource block group based on the power correlation and the power utilization ratio, where 1 is a positive integer; and the processor 1001 is further configured to calculate the sum of the signal to interference plus noise ratio differences of the users in the sub resource block group.

In a possible implementation, the processor 1001 is further configured to calculate initial power of a first sub resource block group by using PEBF;

the processor 1001 is further configured to calculate initial power of a second sub resource block group by using NEBF; and the processor 1001 is further configured to determine power of the first sub resource block group and power of the second sub resource block group based on the initial power of the first sub resource block group and the initial power of the second sub resource block group, where a sum of power of the first sub resource block group and power of the second sub resource block group in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and the processor 1001 is further configured to increase power of the first user based on a modulation scheme of the first user, where a sum of power of the first user after the increase and power of the second user is the same as a sum of the power of the first user before the increase and power of the second user.

In a possible implementation, when the modulation scheme of the first user is quadrature phase shift keying QPSK, an upper increase limit of the power of the first user is one time a maximum power threshold;

when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

It should be understood that the processing apparatus may be a chip. The processor 1001 may be implemented by using hardware or software. When implemented by using hardware, the processor 1001 may be a logic circuit, an integrated circuit, or the like. When implemented by using software, the processor 1001 may be a general-purpose processor, and is implemented by reading software code stored in a memory. The memory may be integrated into the processor 1001, or may be located outside the processor 1001 and exist independently.

The "implemented by using hardware" means that a function of the foregoing module or unit is implemented by using a hardware processing circuit that does not have a program instruction processing function. The hardware processing circuit may include a discrete hardware component, or may be an integrated circuit. To reduce power consumption and a size, an integrated circuit is usually used for implementation. The hardware processing circuit may include an ASIC or a programmable logic device (PLD). The PLD may further include a FPGA, a complex programmable logic device (CPLD), or the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit configured to implement an FPGA function and a CPU may be formed on a silicon base, and are independently packaged into a chip, where the chip is also referred to as a system-on-a-programmable-chip (SoPC).

An embodiment of this application further provides a computer-readable storage medium, including instructions. When the instructions are run on a computer, the computer is enabled to control an encoder to perform any implementation described in the foregoing method embodiments, including:

step A: determining X sub resource block groups based on a scheduled resource block group, where one of the X sub resource block groups includes a part of the resource block group, all resource block groups in each sub resource block group are occupied by a user, and X is a positive integer greater than 1;

step B: determining, based on the X sub resource block groups, a beamforming weight calculation method used for each sub resource block group, where the beamforming weight calculation method includes normalized-eigen beamforming NEBF or power limited-eigen beamforming PEBF;

step C: obtaining, based on the beamforming weight calculation method corresponding to each sub resource block group, a beamforming weight corresponding to the sub resource block group;

step D: weighting data based on the beamforming weight; and step E: sending weighted data.

In a possible implementation, a step: detecting a number of users scheduled in the sub resource block group;

step F: when a single user is scheduled in the sub resource block group, determining that NEBF is used for the sub resource block group; and step G: when multiple users MU are scheduled in the sub resource block group, detecting whether the sub resource block group meets a first preset condition, where NEBF is used for the sub resource block group that meets the first preset condition, and PEBF is used for the sub resource block group that does not meet the first preset condition, where the first preset condition includes one or more of the following:

an average modulation and coding scheme MCS of the multiple users in the sub resource block group is less than a first threshold; or a difference between a first signal to interference plus noise ratio and a second signal to interference plus noise ratio is less than a second threshold, where the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

In a possible implementation, step H: when the users scheduled in the sub resource block group include a user sensitive to a weight direction change, skipping calculating the beamforming weight of the user sensitive to the weight direction change in the sub resource block group.

In a possible implementation, step I: calculating average transmit power of an NEBF set by using NEBF, where the NEBF set includes one or more sub resource block groups, and the beamforming weight is calculated for the sub resource block group in the NEBF set by using NEBF;

step J: calculating weight power of the NEBF set on an $n^{th}$ antenna by using NEBF, where n is an integer greater than or equal to 0;

step K: determining average transmit power of the NEBF set on the $n^{th}$ antenna based on the average transmit power of the NEBF set and the weight power of the NEBF set on the $n^{th}$ antenna; and step L: performing, based on the average transmit power of the NEBF set on the $n^{th}$ antenna, normalization processing on a weight corresponding to the sub resource block group in the NEBF set, to obtain the beamforming weight corresponding to the sub resource block group.

In a possible implementation, step M: calculating average transmit power of a PEBF set by using PEBF, where the PEBF set includes one or more sub resource block groups, and the beamforming weight is calculated for the sub resource block group in the PEBF set by using PEBF;

step N: calculating weight power of the PEBF set on an $n^{th}$ antenna by using PEBF, where n is an integer greater than or equal to 0;

step O: determining average transmit power of the PEBF set on the $n^{th}$ antenna based on the average transmit power of the PEBF set and the weight power of the PEBF set on the $n^{th}$ antenna; and step P: performing, based on the average transmit power of the PEBF set on the $n^{th}$antenna, normalization processing on a weight corresponding to the sub resource block group in the PEBF set, to obtain the beamforming weight corresponding to the sub resource block group.

In a possible implementation, step Q: determining first weight power of the sub resource block group, where the first weight power is weight power calculated for the sub resource block group by using PEBF;

step R: determining second weight power of the sub resource block group, where the second weight power is weight power calculated for the sub resource block group by using NEBF;

step S: calculating a sum of signal to interference plus noise ratio differences of users in the sub resource block group based on the first weight power and the second weight power, where a signal to interference plus noise ratio difference of each user in the sub resource block group is a difference between a signal to interference plus noise ratio calculated based on the first weight power of the user in the sub resource block group and a signal to interference plus noise ratio calculated based on the second weight power of the user in the sub resource block group;

step T: determining, based on the sum of the signal to interference plus noise ratio differences of the users in the sub resource block group, a sum of signal to interference plus noise ratio differences of the X sub resource block groups;

step U: when the sum of the signal to interference plus noise ratio differences of the X sub resource block groups is greater than 0, determining that a beamforming weight calculation method used for the X sub resource block groups is PEBF; and step V: when the sum of the signal to interference plus noise ratio differences of the X sub resource block groups is less than or equal to 0, determining that the beamforming weight calculation method used for the X sub resource block groups is NEBF.

In a possible implementation, step W: performing enhanced zero-forcing processing on the first weight power and the second weight power of the sub resource block group, and calculating power of each row of antennas based on the first weight power on which the enhanced zero-forcing processing is performed and the second weight power on which the enhanced zero-forcing processing is performed;

step X: calculating a power utilization ratio based on a sum of power of all antennas in the power of each row of antennas and maximum power in the power of each row of antennas;

step Y: calculating power correlation of the power of each row of antennas based on the power of each row of antennas and a full-power multi-user weight vector;

step Z: calculating a signal to interference plus noise ratio difference of an $l^{th}$ user in the sub resource block group based on the power correlation and the power utilization ratio, where 1 is a positive integer; and step AA: calculating the sum of the signal to interference plus noise ratio differences of the users in the sub resource block group.

In a possible implementation, step AB: calculating initial power of a first sub resource block group by using PEBF;

step AC: calculating initial power of a second sub resource block group by using NEBF; and step AD: determining power of the first sub resource block group and power of the second sub resource block group based on the initial power of the first sub resource block group and the initial power of the second sub resource block group, where a sum of power of the first sub resource block group and power of the second sub resource block group in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and a sum of power of the first user and power of the second user in a same antenna is equal to maximum power of the same antenna.

In a possible implementation, the users scheduled in the sub resource block group include a first user and a second user, the first user is a user sensitive to a weight direction change, and the second user is a user insensitive to a weight direction change; and step AE: increasing power of the first user based on a modulation scheme of the first user, where a sum of power of the first user after the increase and power of the second user is the same as a sum of the power of the first user before the increase and power of the second user.

In a possible implementation, when the modulation scheme of the first user is quadrature phase shift keying QPSK, an upper increase limit of the power of the first user is one time a maximum power threshold;

when the modulation scheme of the first user is 16 quadrature amplitude modulation QAM, the upper increase limit of the power of the first user is two times the maximum power threshold; and when the modulation scheme of the first user is 64QAM or 256QAM, the power of the first user cannot be increased.

An embodiment of this application further provides a computer program product. The computer program product includes computer program code. When the computer program code is run on a computer, the computer is enabled to perform any implementation described in the foregoing method embodiments.

An embodiment of this application further provides a chip system, including a memory and a processor. The memory is configured to store a computer program, and the processor is configured to invoke the computer program from the memory and run the computer program, to enable a chip to perform any implementation described in the foregoing method embodiments.

An embodiment of this application further provides a chip system, including a processor. The processor is configured to invoke and run a computer program, to enable a chip to perform any implementation described in the foregoing method embodiments.

In addition, it should be noted that the apparatus embodiments described above are merely examples. The units described as separate parts may or may not be physically separate, and parts displayed as units may or may not be physical units, that is, may be located at one position, or may be distributed on a plurality of network units. Some or all the modules may be selected based on actual needs to achieve the objectives of the solutions of embodiments. In addition, in the accompanying drawings of the apparatus embodiments provided in this application, a connection relationship between modules indicates a communications connection between the modules, which may be implemented in some embodiments as one or more communications buses or signal cables.

Based on the descriptions of the foregoing implementations, a person skilled in the art may clearly understand that this application may be implemented by software in addition to universal hardware, or may be implemented by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be in various forms, such as an analog circuit, a digital circuit, or a dedicated circuit. However, as for this application, software program implementation is a better implementation in most cases. Based on such an understanding, the technical solutions of this application essentially or the part contributing to a conventional technology may be implemented in a form of a software product. The computer software product is stored in a readable storage medium, for example, a computer floppy disk, a USB flash drive, a removable hard disk drive, a ROM, a RAM, a magnetic disk, or an optical disc, and includes several instructions for instructing a computer device to perform the methods described in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedure or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, network apparatus, computing device, or data center to another website, computer, network apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a network apparatus or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid state drive (SSD)), or the like.

It should be understood that “one embodiment” or “an embodiment” mentioned in the entire specification means that particular features, structures, or characteristics related to the embodiment are included in one or more embodiments of this application. Therefore, “in one embodiment” or “in an embodiment” appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units, algorithms, and steps can be implemented by electronic hardware, computer software, or a combination thereof. To describe interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

For a detailed working process of the foregoing system, apparatus, and unit, refer to a corresponding process in the foregoing method embodiments. For the purpose of a convenient and brief description, details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, that is, may be located at one position, or may be distributed on a plurality of network units. Some or all the units may be selected based on actual needs to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application.

In conclusion, the foregoing descriptions are merely example embodiments of the technical solutions of this application, but are not intended to limit the protection scope of this application. Any modification, equivalent replacement, or improvement made without departing from the principle of this application shall fall within the protection scope of this application.

What is claimed is:

1. A beamforming weight calculation method, comprising:

determining X sub resource block groups based on a scheduled resource block group, wherein one of the X sub resource block groups comprises a part of the resource block group, and X is a positive integer greater than 1;

determining, based on the X sub resource block groups, a beamforming weight calculation method used for a plurality of sub resource block groups in the X sub resource block groups, wherein the beamforming weight calculation method comprises normalized-eigen beamforming (NEBF) or power limited-eigen beamforming (PEBF);

obtaining, based on the beamforming weight calculation method corresponding to each sub resource block group in the plurality of sub resource block groups, a beamforming weight corresponding to the each sub resource block group;

weighting data based on the beamforming weight; and sending weighted data.

2. The method according to claim 1, wherein the determining, based on the X sub resource block groups, a beamforming weight calculation method used for a plurality of sub resource block groups in the X sub resource block groups comprises:

detecting a number of users scheduled in a sub resource block group;

when a single user is scheduled in the sub resource block group, determining that NEBF is used for the sub resource block group; and when multiple users are scheduled in the sub resource block group, detecting whether the sub resource block group meets a first preset condition, wherein NEBF is used for the sub resource block group that meets the first preset condition, and PEBF is used for the sub resource block group that does not meet the first preset condition, wherein the first preset condition comprises one or more of the following:

an average modulation and coding scheme of the multiple users in the sub resource block group is less than a first threshold;

a difference between a first signal to interference plus noise ratio and a second signal to interference plus noise ratio is less than a second threshold, wherein the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

3. The method according to claim 2, wherein the method further comprises:

when the users scheduled in the sub resource block group comprise a user sensitive to a weight direction change, skipping calculating a beamforming weight of the user sensitive to the weight direction change in the sub resource block group.

4. The method according to claim 1, wherein the obtaining, based on the beamforming weight calculation method corresponding to each sub resource block group in the plurality of sub resource block groups, a beamforming weight corresponding to the each sub resource block group comprises:

calculating average transmit power of an NEBF set by using NEBF, wherein the NEBF set comprises one or more sub resource block groups, and the beamforming weight is calculated for a sub resource block group in the NEBF set by using NEBF;

calculating weight power of the NEBF set on an $n^{th}$ antenna by using NEBF, wherein n is an integer greater than or equal to 0;

determining average transmit power of the NEBF set on the $n^{th}$ antenna based on the average transmit power of the NEBF set and the weight power of the NEBF set on the $n^{th}$ antenna; and performing, based on the average transmit power of the NEBF set on the $n^{th}$ antenna, normalization processing on a weight corresponding to the sub resource block group in the NEBF set, to obtain a beamforming weight corresponding to the sub resource block group.

5. The method according to claim 1, wherein the obtaining, based on the beamforming weight calculation method corresponding to each sub resource block group in the plurality of sub resource block groups, a beamforming weight corresponding to the each sub resource block group comprises:

calculating average transmit power of a PEBF set by using PEBF, wherein the PEBF set comprises one or more sub resource block groups, and the beamforming weight is calculated for a sub resource block group in the PEBF set by using PEBF;

calculating weight power of the PEBF set on an $n^{th}$ antenna by using PEBF, wherein n is an integer greater than or equal to 0;

determining average transmit power of the PEBF set on the $n^{th}$ antenna based on the average transmit power of the PEBF set and the weight power of the PEBF set on the $n^{th}$ antenna; and performing, based on the average transmit power of the PEBF set on the $n^{th}$ antenna, normalization processing on a weight corresponding to the sub resource block group in the PEBF set, to obtain the beamforming weight corresponding to the sub resource block group.

6. The method according to claim 1, wherein the determining, based on the X sub resource block groups, a beamforming weight calculation method used for a plurality of sub resource block groups in the X sub resource block groups comprises:

determining first weight power of a sub resource block group, wherein the first weight power is weight power calculated for the sub resource block group by using PEBF;

determining second weight power of the sub resource block group, wherein the second weight power is weight power calculated for the sub resource block group by using NEBF;

calculating a sum of signal to interference plus noise ratio differences of users in the sub resource block group based on the first weight power and the second weight power, wherein a signal to interference plus noise ratio difference of each user in the sub resource block group is a difference between a signal to interference plus noise ratio calculated based on the first weight power of a user in the sub resource block group and a signal to interference plus noise ratio calculated based on the second weight power of the user in the sub resource block group;

determining, based on the sum of the signal to interference plus noise ratio differences of the users in the sub resource block group, a sum of signal to interference plus noise ratio differences of the X sub resource block groups;

when the sum of the signal to interference plus noise ratio differences of the X sub resource block groups is greater than 0, determining that a beamforming weight calculation method used for the X sub resource block groups is PEBF; and when the sum of the signal to interference plus noise ratio differences of the X sub resource block groups is less than or equal to 0, determining that the beamforming weight calculation method used for the X sub resource block groups is NEBF.

7. The method according to claim 6, wherein the calculating a sum of signal to interference plus noise ratio differences of users in the sub resource block group based on the first weight power and the second weight power comprises:

performing enhanced zero-forcing processing on the first weight power and the second weight power of the sub resource block group, and calculating power of each row of antennas based on the first weight power on which the enhanced zero-forcing processing is performed and the second weight power on which the enhanced zero-forcing processing is performed;

calculating a power utilization ratio based on a sum of power of all antennas in the power of each row of antennas and maximum power in the power of each row of antennas;

calculating power correlation of the power of each row of antennas based on the power of each row of antennas and a full-power multi-user weight vector;

calculating a signal to interference plus noise ratio difference of an $l^{th}$ user in the sub resource block group based on the power correlation and the power utilization ratio, wherein l is a positive integer; and calculating the sum of the signal to interference plus noise ratio differences of the users in the sub resource block group.

8. The method according to claim 1, wherein the method further comprises:

calculating initial power of a first sub resource block group by using PEBF;

calculating initial power of a second sub resource block group by using NEBF; and determining power of the first sub resource block group and power of the second sub resource block group based on the initial power of the first sub resource block group and the initial power of the second sub resource block group, wherein a sum of power of the first sub resource block group and power of the second sub resource block group in a same antenna is equal to maximum power of the same antenna.

9. The method according to claim 1, wherein users scheduled in a sub resource block group comprise a first user and a second user, the first user is a user sensitive to a weight direction change, and the second user is a user insensitive to a weight direction change; and a sum of power of the first user and power of the second user in a same antenna is equal to maximum power of the same antenna.

10. The method according to claim 1, wherein the method further comprises:

users scheduled in a sub resource block group comprise a first user and a second user, the first user is a user sensitive to a weight direction change, and the second user is a user insensitive to a weight direction change; and increasing power of the first user based on a modulation scheme of the first user, wherein a sum of power of the first user after the increase and power of the second user is the same as a sum of the power of the first user before the increase and power of the second user.

11. An apparatus, comprising:

at least one processor, and a memory storing instructions for execution by the at least one processor;

wherein, when executed, the instructions cause the apparatus to:

determine X sub resource block groups based on a scheduled resource block group, wherein one of the X sub resource block groups comprises a part of the resource block group, and X is a positive integer greater than 1;

determine, based on the X sub resource block groups, a beamforming weight calculation method used for a plurality of sub resource block groups in the X sub resource block groups, wherein the beamforming weight calculation method comprises normalized-eigen beamforming (NEBF) or power limited-eigen beamforming (PEBF);

obtain, based on the beamforming weight calculation method corresponding to each sub resource block group in the plurality of sub resource block groups, a beamforming weight corresponding to the each sub resource block group;

weight data based on the beamforming weight; and send weighted data.

12. The apparatus according to claim 11, wherein the determining, based on the X sub resource block groups, a beamforming weight calculation method used for a plurality of sub resource block groups in the X sub resource block groups comprises:

detecting a number of users scheduled in a sub resource block group;

when a single user is scheduled in the sub resource block group, determining that NEBF is used for the sub resource block group; and when multiple users are scheduled in the sub resource block group, detecting whether the sub resource block group meets a first preset condition, wherein NEBF is used for the sub resource block group that meets the first preset condition, and PEBF is used for the sub resource block group that does not meet the first preset condition, wherein the first preset condition comprises one or more of the following:

an average modulation and coding scheme of the multiple users in the sub resource block group is less than a first threshold;

a difference between a first signal to interference plus noise ratio and a second signal to interference plus noise ratio is less than a second threshold, wherein the first signal to interference plus noise ratio is a signal to interference plus noise ratio calculated based on first weight power of the sub resource block group, the second signal to interference plus noise ratio is a signal to interference plus noise ratio calculated based on second power of the sub resource block group, the first weight power is weight power calculated for the sub resource block group by using NEBF, and the second weight power is weight power calculated for the sub resource block group by using PEBF; or channel correlation or weight correlation between the users in the sub resource block groups is less than a third threshold.

13. The apparatus according to claim 12, wherein, when executed, the instructions cause the apparatus to:

when the users scheduled in the sub resource block group comprise a user sensitive to a weight direction change, skip calculating a beamforming weight of the user sensitive to the weight direction change in the sub resource block group.

14. The apparatus according to claim 11, wherein the obtaining, based on the beamforming weight calculation method corresponding to each sub resource block group in the plurality of sub resource block groups, a beamforming weight corresponding to the each sub resource block group comprises:

calculating average transmit power of an NEBF set by using NEBF, wherein the NEBF set comprises one or more sub resource block groups, and the beamforming weight is calculated for a sub resource block group in the NEBF set by using NEBF;

calculating weight power of the NEBF set on an $n^{th}$ antenna by using NEBF, wherein n is an integer greater than or equal to 0;

determining average transmit power of the NEBF set on the $n^{th}$ antenna based on the average transmit power of the NEBF set and the weight power of the NEBF set on the $n^{th}$ antenna; and performing, based on the average transmit power of the NEBF set on the $n^{th}$ antenna, normalization processing on a weight corresponding to the sub resource block group in the NEBF set, to obtain a beamforming weight corresponding to the sub resource block group.

15. The apparatus according to claim 11, wherein the obtaining, based on the beamforming weight calculation method corresponding to each sub resource block group in the plurality of sub resource block groups, a beamforming weight corresponding to the each sub resource block group comprises:

calculating average transmit power of a PEBF set by using PEBF, wherein the PEBF set comprises one or more sub resource block groups, and the beamforming weight is calculated for a sub resource block group in the PEBF set by using PEBF;

calculating weight power of the PEBF set on an $n^{th}$ antenna by using PEBF, wherein n is an integer greater than or equal to 0;

determining average transmit power of the PEBF set on the $n^{th}$ antenna based on the average transmit power of the PEBF set and the weight power of the PEBF set on the $n^{th}$ antenna; and performing, based on the average transmit power of the PEBF set on the $n^{th}$ antenna, normalization processing on a weight corresponding to the sub resource block group in the PEBF set, to obtain the beamforming weight corresponding to the sub resource block group.

16. The apparatus according to claim 11, wherein the determining, based on the X sub resource block groups, a beamforming weight calculation method used for a plurality of sub resource block groups in the X sub resource block groups comprises:

determining first weight power of a sub resource block group, wherein the first weight power is weight power calculated for the sub resource block group by using PEBF;

determining second weight power of the sub resource block group, wherein the second weight power is weight power calculated for the sub resource block group by using NEBF;

calculating a sum of signal to interference plus noise ratio differences of users in the sub resource block group based on the first weight power and the second weight power, wherein a signal to interference plus noise ratio difference of each user in the sub resource block group is a difference between a signal to interference plus noise ratio calculated based on the first weight power of a user in the sub resource block group and a signal to interference plus noise ratio calculated based on the second weight power of the user in the sub resource block group;

determining, based on the sum of the signal to interference plus noise ratio differences of the users in the sub resource block group, a sum of signal to interference plus noise ratio differences of the X sub resource block groups;

when the sum of the signal to interference plus noise ratio differences of the X sub resource block groups is greater than 0, determining that a beamforming weight calculation method used for the X sub resource block groups is PEBF; and when the sum of the signal to interference plus noise ratio differences of the X sub resource block groups is less than or equal to 0, determining that the beamforming weight calculation method used for the X sub resource block groups is NEBF.

17. The apparatus according to claim 16, wherein the calculating a sum of signal to interference plus noise ratio differences of users in the sub resource block group based on the first weight power and the second weight power comprises:

performing enhanced zero-forcing processing on the first weight power and the second weight power of the sub resource block group, and calculating power of each row of antennas based on the first weight power on which the enhanced zero-forcing processing is performed and the second weight power on which the enhanced zero-forcing processing is performed;

calculating a power utilization ratio based on a sum of power of all antennas in the power of each row of antennas and maximum power in the power of each row of antennas;

calculating power correlation of the power of each row of antennas based on the power of each row of antennas and a full-power multi-user weight vector;

calculating a signal to interference plus noise ratio difference of an $l^{th}$ user in the sub resource block group based on the power correlation and the power utilization ratio, wherein $l$ is a positive integer; and calculating the sum of the signal to interference plus noise ratio differences of the users in the sub resource block group.

18. The apparatus according to claim 11, wherein, when executed, the instructions cause the apparatus to:

calculate initial power of a first sub resource block group by using PEBF;

calculate initial power of a second sub resource block group by using NEBF; and determine power of the first sub resource block group and power of the second sub resource block group based on the initial power of the first sub resource block group and the initial power of the second sub resource block group, wherein a sum of power of the first sub resource block group and power of the second sub resource block group in a same antenna is equal to maximum power of the same antenna.

19. The apparatus according to claim 11, wherein users scheduled in a sub resource block group comprise a first user and a second user, the first user is a user sensitive to a weight direction change, and the second user is a user insensitive to a weight direction change; and a sum of power of the first user and power of the second user in a same antenna is equal to maximum power of the same antenna.

20. The apparatus according to claim 11, wherein users scheduled in a sub resource block group comprise a first user and a second user, the first user is a user sensitive to a weight direction change, and the second user is a user insensitive to a weight direction change; and the when executed, the instructions cause the apparatus to:

increase power of the first user based on a modulation scheme of the first user, wherein a sum of power of the first user after the increase and power of the second user is the same as a sum of the power of the first user before the increase and power of the second user.

* * * * *